(12) United States Patent
Böhringer et al.

(10) Patent No.: US 11,141,711 B2
(45) Date of Patent: Oct. 12, 2021

(54) TEXTILE PROTECTIVE MATERIAL OF A NEW TYPE AND METHOD FOR PRODUCING SAME

(71) Applicant: Blücher GmbH, Erkrath (DE)

(72) Inventors: Bertram Böhringer, Wuppertal (DE); Anna Carstensen, Düsseldorf (DE); Cong Minh Nguyen, Wuppertal (DE)

(73) Assignee: BLÜCHER GMBH, Erkrath (DE)

( * ) Notice: Subject to any disclaimer, the term of this patent is extended or adjusted under 35 U.S.C. 154(b) by 933 days.

(21) Appl. No.: 15/747,633

(22) PCT Filed: May 12, 2016

(86) PCT No.: PCT/EP2016/060688
§ 371 (c)(1),
(2) Date: Jan. 25, 2018

(87) PCT Pub. No.: WO2017/016694
PCT Pub. Date: Feb. 2, 2017

(65) Prior Publication Data
US 2018/0207613 A1 Jul. 26, 2018

(30) Foreign Application Priority Data

Jul. 25, 2015 (EP) .............................. 102015009687
Jul. 29, 2015 (EP) .............................. 102015112381
Aug. 11, 2015 (EP) .............................. 102015113213

(51) Int. Cl.
*B01D 53/02* (2006.01)
*B01J 20/28* (2006.01)
(Continued)

(52) U.S. Cl.
CPC ........ *B01J 20/28028* (2013.01); *A41D 13/00* (2013.01); *A41D 31/00* (2013.01);
(Continued)

(58) Field of Classification Search
CPC ...... A41D 13/00; A61D 31/00; A61D 31/145; A61D 31/305; A62B 17/00; A62B 17/006; A62B 17/04; A62B 23/00; A62B 23/02; B01D 2239/0407; B01D 2239/0681; B01D 2239/10; B01D 2259/4508; B01D 2259/4583; B01D 53/02; B01J 20/20;
(Continued)

(56) References Cited

U.S. PATENT DOCUMENTS 2,999,763 A * 9/1961 Sommer ................ D04H 11/00
427/206
4,459,332 A * 7/1984 Giglia ...................... B32B 5/26
428/87

(Continued)

*Primary Examiner* — Christopher P Jones
(74) *Attorney, Agent, or Firm* — Edward E. Sowers; Brannon Sowers & Cracraft PC

(57) ABSTRACT

The invention relates to a textile protective material, in particular providing protection against radioactive harmful and/or toxic substances and/or against biological harmful and/or toxic substances and/or against chemical harmful and/or toxic substances, preferably a textile adsorption filter material, and to a method for the production thereof. The textile protective material is suitable in particular for producing protective equipment and protective objects and filters and filter materials of all types.

21 Claims, 4 Drawing Sheets

(51) Int. Cl.

| | | |
|---|---|---|
| A62D 5/00 | (2006.01) | |
| B01J 20/20 | (2006.01) | |
| B01J 20/32 | (2006.01) | |
| G21F 3/02 | (2006.01) | |
| A62B 17/00 | (2006.01) | |
| C09J 7/38 | (2018.01) | |
| C09J 7/21 | (2018.01) | |
| C09J 5/08 | (2006.01) | |
| D06M 11/79 | (2006.01) | |
| D06M 23/04 | (2006.01) | |
| D06M 15/37 | (2006.01) | |
| G21F 1/12 | (2006.01) | |
| D06M 17/04 | (2006.01) | |
| D06M 11/73 | (2006.01) | |
| B32B 7/14 | (2006.01) | |
| A62B 23/00 | (2006.01) | |
| B32B 33/00 | (2006.01) | |
| B01D 39/08 | (2006.01) | |
| A41D 13/00 | (2006.01) | |
| A41D 31/00 | (2019.01) | |
| A62B 17/04 | (2006.01) | |
| A62B 23/02 | (2006.01) | |
| B01J 20/26 | (2006.01) | |
| B01J 20/30 | (2006.01) | |
| B32B 5/02 | (2006.01) | |
| B32B 5/16 | (2006.01) | |
| B32B 5/24 | (2006.01) | |
| B32B 7/12 | (2006.01) | |
| B32B 37/12 | (2006.01) | |
| B32B 37/24 | (2006.01) | |
| D06N 3/04 | (2006.01) | |
| A41D 31/14 | (2019.01) | |
| A41D 31/30 | (2019.01) | |

(52) U.S. Cl.
CPC ............ *A62B 17/00* (2013.01); *A62B 17/006* (2013.01); *A62B 17/04* (2013.01); *A62B 23/00* (2013.01); *A62B 23/02* (2013.01); *A62D 5/00* (2013.01); *B01D 39/08* (2013.01); *B01D 39/083* (2013.01); *B01D 53/02* (2013.01); *B01J 20/20* (2013.01); *B01J 20/261* (2013.01); *B01J 20/262* (2013.01); *B01J 20/28035* (2013.01); *B01J 20/28057* (2013.01); *B01J 20/28069* (2013.01); *B01J 20/3042* (2013.01); *B01J 20/324* (2013.01); *B01J 20/3223* (2013.01); *B01J 20/3295* (2013.01); *B32B 5/02* (2013.01); *B32B 5/16* (2013.01); *B32B 5/24* (2013.01); *B32B 7/12* (2013.01); *B32B 7/14* (2013.01); *B32B 33/00* (2013.01); *B32B 37/12* (2013.01); *B32B 37/24* (2013.01); *C09J 5/08* (2013.01); *C09J 7/21* (2018.01); *C09J 7/38* (2018.01); *C09J 7/385* (2018.01); *D06M 11/73* (2013.01); *D06M 11/79* (2013.01); *D06M 15/37* (2013.01); *D06M 17/04* (2013.01); *D06M 23/04* (2013.01); *D06N 3/042* (2013.01); *G21F 1/12* (2013.01); *G21F 3/02* (2013.01); *A41D 31/145* (2019.02); *A41D 31/305* (2019.02); *B01D 2239/0407* (2013.01); *B01D 2239/0681* (2013.01); *B01D 2239/10* (2013.01); *B01D 2253/102* (2013.01); *B01D 2257/93* (2013.01); *B01D 2259/4508* (2013.01); *B01D 2259/4583* (2013.01); *B32B 2037/1253* (2013.01); *B32B 2037/243* (2013.01); *B32B 2255/02* (2013.01); *B32B 2255/26* (2013.01); *B32B 2264/108* (2013.01); *B32B 2305/72* (2013.01); *B32B 2307/724* (2013.01); *B32B 2313/04* (2013.01); *B32B 2437/00* (2013.01); *B32B 2571/00* (2013.01); *C09J 2400/24* (2013.01); *C09J 2400/263* (2013.01); *C09J 2433/00* (2013.01); *C09J 2475/00* (2013.01); *D06N 2209/121* (2013.01); *D06N 2211/10* (2013.01); *D06N 2211/30* (2013.01); *D10B 2501/00* (2013.01); *D10B 2505/04* (2013.01)

(58) Field of Classification Search
CPC .. B01J 20/261; B01J 20/262; B01J 20/28028; B01J 20/28035; B01J 20/28057; B01J 20/28069; B01J 20/3042; B01J 20/3223; B01J 20/324; B01J 20/3295; B32B 5/02; B32B 5/16; B32B 5/24; B32B 5/30; C09J 2400/24; C09J 2400/263
See application file for complete search history.

(56) References Cited

U.S. PATENT DOCUMENTS

| | | | | |
|---|---|---|---|---|
| 4,990,201 | A * | 2/1991 | Trnka | B32B 7/12 156/85 |
| 6,130,268 | A * | 10/2000 | Murray | E04D 3/36 521/131 |
| 2005/0020160 | A1* | 1/2005 | Rock | B32B 27/34 428/195.1 |
| 2005/0266228 | A1* | 12/2005 | Jain | B32B 5/026 428/316.6 |
| 2005/0266749 | A1* | 12/2005 | De Ruiter | B01J 20/28023 442/59 |
| 2007/0059504 | A1* | 3/2007 | von Blacher | A62D 5/00 428/220 |
| 2010/0313759 | A1* | 12/2010 | Bones | B01J 20/20 96/12 |
| 2011/0010826 | A1* | 1/2011 | Kaskel | B01J 20/2803 2/457 |
| 2011/0042004 | A1* | 2/2011 | Schubert | B32B 37/1284 156/329 |
| 2011/0300361 | A1* | 12/2011 | Nakayama | C09J 7/26 428/220 |
| 2014/0186243 | A1* | 7/2014 | Li | B01J 20/324 423/210 |
| 2016/0108292 | A1* | 4/2016 | Yamakami | C09J 7/26 428/220 |

* cited by examiner

TEXTILE PROTECTIVE MATERIAL OF A NEW TYPE AND METHOD FOR PRODUCING SAME

CROSS-REFERENCES TO RELATED APPLICATIONS

This application is a National Stage filing of International Application PCT/EP 2016/060688, filed May 12, 2016, claiming priority to DE 10 2015 009 687.7 filed Jul. 25, 2015, to DE 10 2015 112 381.9 filed Jul. 29, 2015, and to DE 10 2015 113 213.3 filed Aug. 11, 2015, entitled "Textile Protective Material of a New Type and Method for Producing Same". The subject application claims priority to PCT/EP 2016/060688, to DE 10 2015 009 687.7, to DE 10 2015 112 381.9, and to DE 10 2015 113 213.3, and incorporates all by reference herein, in their entirety.

The present invention relates to the technical field of textile type protective materials useful for example for protective apparel or for filters in the civilian or military sector, for example in the manufacture of protective suits or the like.

In this context, the present invention relates to a textile type protective material as such which more particularly is endowed with/provides a protective function against radioactive/biological/chemical noxiant/poison materials, wherein the textile type protective material according to the invention has a specific layer-shaped construction.

The present invention further also relates to a method for producing the textile type protective material according to the invention and also specific methods of using the subject invention protective material especially in the manufacture of protective equipments/protective articles and also in the manufacture of filters and filtering materials of any kind. The present invention additionally also relates to protective equipments/protective articles and also filters and filtering materials comprising the protective material of the present invention and/or obtained by using the protective material of the present invention.

Chemical, biological and nuclear poison/warfare agent materials generally pose a high potential hazard for people coming into contact with such substances, for example soldiers in combat deployment, particularly since even just minimal amounts/concentrations of such substances can lead to the death or at least lasting physical impairment of people confronted with these substances.

There are a series of substances/materials which are taken up by the skin on contact and even in minimal amounts/concentrations lead to serious physical harm (noxae). Examples from the field of chemical poison/warfare agent materials include particularly the vesicant HD (Yellow Cross) and the nerve agent sarin. People likely to come into contact with such highly toxic poisons must accordingly wear a suitable protective apparel and/or be protected against these substances/poisons by suitable protective materials.

This also holds in principle for biological warfare agent/poison materials, such as bacteria, viruses or toxins of biological origin, which similarly lead to lasting physical problems on contact and especially directly or indirectly (i.e., by subsequent uptake into the body, for example via mucosae or the like). It is lastly also necessary to avoid any direct contact and/or any contamination with radioactive substances, including particularly in the form of radioactive particles or the like.

The adduced noxiant/poison materials, especially chemical warfare agent materials, are further also capable of taking a gaseous form but also the form of occasionally finely divided particles, for example as aerosol or the like, representing a further challenge for the protective materials to be provided in that they have to render the poison/warfare agent materials in question harmless.

Known means to ensure a certain level of protective function against the aforementioned poison/warfare agent materials include in general for example air and water vapor impervious protective suits or the like that are equipped with a rubber layer impervious to poison/warfare agent materials, especially of the aforementioned kind. Protective systems of this type, however, have the central disadvantage that protective equipments produced therefrom, for example in the form of protective suits, cause a very rapid buildup of heat in the donned/employed state (as for example in the context of combat deployment involving a high level of physical exertion on the part of the wearer), since systems of this type have no air and water vapor perviousness and so lack any moisture and temperature regulative properties, particularly since there is neither any breathability nor any efficient ventilation.

The prior art further features the deployment, in the manufacture of protective suits for example, of such protective materials as are endowed with an air impervious yet water vapor pervious membrane said to act as a blocking layer with regard to toxic substances. One example of such a protective material is described in WO 96/37365 A1 and also in the same patent family's co-member U.S. Pat. No. 5,743,775 A and/or DE 195 18 683 A1. Protective suits having a water vapor pervious membrane which is impervious to poisons, especially contact poisons, have the fundamental disadvantage that poisons penetrating at nontight places, caused by mechanical damage for example, remain inside the protective suit and therefore are taken up by the skin of the wearer. In addition, the wearing comfort is not always satisfactory because of the altogether limited ventilation.

Permeable, air pervious protective materials are additionally also known in the prior art to improve the wearing comfort in particular, they generally have an adsorptive filtering layer based on activated carbon, the activated carbon being capable of durably binding the underlying poison/warfare agent materials, especially the underlying chemical poisons, so even badly contaminated suits do not pose a risk to the wearer. As noted, protective systems of this type, by enabling the effective exchange of air and water/water vapor, have a high wearing comfort coupled with good in-principle protective function against the underlying poison/warfare agent materials, particularly since one advantage is that the deployed activated carbon is also accessible on the inside surface, i.e., the wearer facing side of the protective material, so poisons penetrating at damaged or otherwise nontight places are rapidly adsorbed and rendered harmless.

In permeable, air pervious protective suits known in this context, for example, specifically pulverulent activated carbon is applied to a carrier layer in a dispersion by deploying a binder. Yet here there is a general disadvantage in that the activated carbon is not fully accessible for the substances to be adsorbed.

It is further known in the prior art regarding permeable/air pervious protective suits to use the punctuate/discontinuous (discontinuous-punctuate) application of a binder to a carrier to fix the deployed activated carbon in punctuate form, which generally improves the air perviousness of such systems. Under extreme conditions, especially when a drop of a thickened poison/warfare agent material lands on the protective material from a comparatively great height and penetrates through to the activated carbon, however, the activated carbon layer may be locally inadequate. It may further be an occasional occurrence with such materials that some of the punctuately applied adhesive will fall between the yarn system of the carrier in the course of the production process of the material, which is detrimental to the fixing of the adsorbents and may lead to bare places.

BRIEF SUMMARY OF THE INVENTION

Against this background, therefore, the problem addressed by the present invention is that of providing a protective/adsorptive filtering material by which the above-described disadvantages of the prior art are at least substantially avoided or else at least ameliorated. More particularly, such a protective/adsorptive filtering material shall also be useful for the manufacture of protective equipments/articles having protective function against chemical/biological/nuclear poison/warfare agent materials and also of filters and filtering materials.

The problem addressed by the present invention is further that of providing such a protective material which combines a high air transmission rate and a high water vapor transmission rate with an effective protective function against chemical, biological and also radioactive/nuclear noxiant/poison materials, such as chemical warfare agent materials in particular. More particularly here, a protective function against the noxiant/poison materials in question which is improved over the prior art shall be provided while at the same time ensuring a high air transmission rate, associated with a high wearing comfort in the case of use for protective apparel or the like.

The problem addressed by the present invention is yet further also that of providing a corresponding protective material very useful in protective equipments/articles (e.g., protective suits, protective gloves, protective shoes and other protective apparel pieces and also protective covers, sleeping bags and the like).

The problem addressed by the present invention is finally yet further that of providing a protective/adsorptive filtering material which is very useful in filters and filtering materials (as, for example, for removal of noxiant, odorant and poison materials of any kind, especially from air and/or gas streams, such as protective respirator filters, odor filters, sheet filters, air filters, adsorption capable carrier structures and filters for the medical sector), while ensuring good filtering efficiency coupled with flowability for the medium to be cleaned up.

The protective/adsorptive filtering material provided according to the present invention shall additionally have a high level of durability and stability and also an optimized/low basis weight.

By way of solution to the problem defined above, therefore, the present invention—according to a first aspect of the present invention—proposes a textile type protective material, especially with protective function against radioactive noxiant and/or poison materials and/or against biological noxiant and/or poison materials and/or against chemical noxiant and/or poison materials, preferably a textile type adsorptive filtering material, as described herein; particular advantageous developments and refinements of this aspect of the present invention are similarly described.

The present invention yet further provides—according to a second aspect of the present invention—a method for producing the textile type protective material including advantageous refinements.

The present invention additionally further provides—according to a third aspect of the present invention—the method of using the protective material of the present invention in the manufacture of protective equipments/articles of any kind and/or in the manufacture of filters and filtering materials of any kind.

The present invention additionally further provides—according to a fourth aspect of the present invention—the protective equipments/articles of the present invention which contain the protective material of the present invention and/or were obtained by using the protective material according to the invention.

The present invention lastly further provides—according to a fifth aspect of the present invention—filters and filtering materials which include the protective material of the present invention and/or which were obtained by using the protective material of the present invention as described herein.

It will be readily understood that, in the hereinbelow following description of the present invention, such versions, embodiments, advantages, examples or the like as are recited hereinbelow in respect of one aspect of the present invention only, for the avoidance of unnecessary repetition, self-evidently also apply mutatis mutandis to the other aspects of the present invention without the need for any express mention.

It will further be readily understood that any values, numbers and ranges recited hereinbelow shall not be construed as limiting the respective value, number and range recitations; a person skilled in the art will appreciate that in a particular case or for a particular use, departures from the recited ranges and particulars are possible without leaving the realm of the present invention.

Moreover, any hereinbelow recited value/parameter particulars or the like can in principle be determined/quantified using standard/standardized or explicitly recited methods of determination or else using methods of determination/measurement which are per se familiar to a person skilled in the art. Unless otherwise indicated, the underlying values/parameters are determined under standard conditions (i.e., particularly at a temperature of 20° C. and/or at a pressure of 1013.25 hPa or 1.01325 bar).

As for the rest, any hereinbelow recited relative/percentage, specifically weight-based, recitations of quantity must be understood as having to be selected/combined by a person skilled in the art within the context of the present invention such that the sum total—including where applicable further components/ingredients, in particular as defined hereinbelow—must always add up to 100% or 100 wt %. However, this is self-evident to a person skilled in the art.

Having made that clear, the present invention will now be more particularly described and this also by means of drawings/figures depicting preferred and/or exemplary embodiments.

DETAILED DESCRIPTION OF THE INVENTION

Figure 1A:
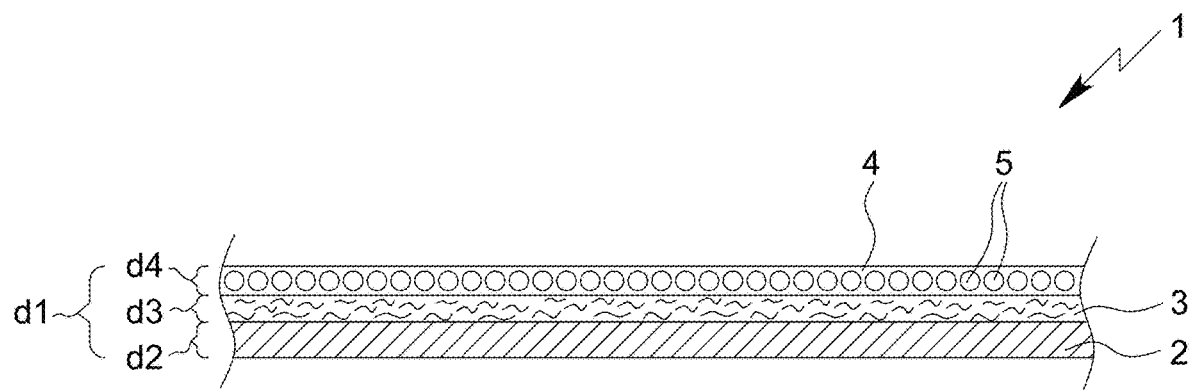
FIG. 1A shows a cross-sectional depiction through an inventive textile type protective material and/or textile type adsorptive filtering material wherein the protective material includes a textile carrier having an adhesive layer applied thereon in the form of an air pervious, dried/cured broken adhesive polymer foam wherein a multiplicity of individual adsorbent particles are adhered on the adhesive layer to form an adsorptive layer.

The present invention thus provides—according to a first aspect of the present invention—a textile type protective material, especially with protective function against radioactive noxiant and/or poison materials and/or against biological noxiant and/or poison materials and/or against chemical noxiant and/or poison materials, preferably chemical warfare agent materials, preferably a textile type adsorptive filtering material, wherein the textile type protective material comprises:

(a) a preferably two-dimensional and/or sheetlike, specifically air pervious textile carrier, especially in the form of a textile sheetlike material;

(b) an adhesive layer applied on the textile carrier, wherein the adhesive layer is an air pervious and/or discontinuous layer based on a dried and/or cured, specifically crosslinked, broken (disintegrated) adhesive polymer foam; and (c) an adsorptive layer adhered to the adhesive layer, wherein the adsorptive layer comprises or is formed from a multiplicity of individual adsorbent particles.

This is because the applicant has now found that, completely surprisingly, the textile type protective/adsorptive filtering material according to the invention is capable of providing not only a high air transmission rate but also an efficient protective function against radioactive, biological and also chemical noxiant/poison materials, especially chemical warfare agent materials, by purpose-directedly providing in relation to the textile type protective material according to the invention a specific layered structure/construction, in that a particulate adsorbent and/or a multiplicity of individual adsorbent particles are fixed on an adhesive layer applied on a textile carrier, the adhesive layer being air pervious and taking the form of a dried/cured, specifically crosslinked, broken/disintegrated adhesive polymer foam.

The concept of the present invention is based on using for adsorbents a specific type of adhesive layer—generally applied full areally on the carrier—in the form of a broken/disintegrated foam and firstly ensures a homogeneous/full areal occupancy of the surface of the foam layer with the adsorbents, which leads to outstanding adsorptive properties for the textile type protective material according to the invention. Secondly, the purpose directed deployment of a broken adhesive polymer foam also leads, at the same time, to the underlying adhesive layer being provided a high air transmission rate entailing an improved wearing physiology due to the resulting high breathability of the protective material as a whole. The present invention has also succeeded in providing textile type protective materials which versus the prior art have a productively decreased basis weight since by virtue of the outstanding fixability of the adsorbents on the broken foam, smaller sizes of particle in relation to the adsorbents and altogether smaller quantities of adhesive are usable. The homogeneous configuration of the adsorptive layer even makes it possible to reduce the add-on amount of adsorbents—and this without affecting the performance capability of the material. In this context, the thickness of the adhesive layer can also be reduced, as can therefore the thickness of the resulting (protective) material as a whole.

The protective material provided according to the present invention additionally has outstanding tactile properties, which is similarly associated with the use of a sheetlike adhesive layer based on a broken foam with the respective fixation of relatively small adsorptive particles. In this context, the protective material according to the invention also has outstanding properties with regards its flexibility and its bending behavior, particularly since the cured/dried, broken adhesive polymer foam, or the corresponding adhesive layer, is flexible/reversibly extensible (elastic) as such. The invention accordingly provides in particular that the cured/dried, broken adhesive polymer foam/layer has a flexible and/or elastic and/or reversibly extensible configuration.

As noted, it is a central concept of the present invention that the adhesive layer is present in the form of a broken foam. In the context of the present invention, the term "broken" (interchangeably also referred to as "disintegrated" and/or "destroyed") as used in reference to the dried/cured, specifically crosslinked adhesive polymer foam and/or the adhesive layer as such, is more particularly to be understood as meaning that the broken adhesive polymer foam of the present invention comprises an altogether air pervious system which—especially in consequence of a specific procedure for producing the material from a previously foamed and nondried dispersion/solution applied on the textile carrier followed by drying/curing to break/destroy the foam structures—has in its dried/cured state a multiplicity of destroyed/burst/collapsed foam bubbles. Accordingly, the dried/cured, specifically crosslinked, broken adhesive polymer foam and/or the adhesive layer may also be referred to as a disintegrated foam. As elaborated hereinbelow, the broken adhesive polymer foam and/or the underlying destroyed foam bubbles have a multiplicity of destroyed/ broken/collapsed walls, lamellae/struts composed of the underlying adhesive polymer.

An additional consequence resulting from the destroyed/broken/disintegrated foam, as elaborated hereinbelow, is a multiplicity of apertures, pores, channels and/or openings in the destroyed/broken-/disintegrated foam system of the adhesive layer, which more particularly extend through the entire layer, leading to the air perviousness—created so to speak by the foam breaking/disintegrating—of the adhesive layer and of the textile type protective material as a whole.

As hereinbelow elaborated with reference to the method of the present invention, the procedure adopted by the invention to produce the protective material of the invention provides more particularly such that an initially intact undried and/or never (completely) cured foam is applied on a textile carrier to provide the adhesive layer, followed by a step of applying the adsorbents/adsorbent particles on the (foam) layer with in turn subsequent curing of the thus applied adhesive layer to break (open) and/or destroy and/or disintegrate the foam system to obtain the broken adhesive polymer foam in the dried/cured state, while the layer type, contiguous construction of the adhesive layer as such is in principle maintained.

The procedure of the present invention further enables a homogeneous/uniform, large area application of the adsorbent particles coupled with simultaneously low basis weights for the applied adhesive polymer deployed for fixing.

The overall result is therefore a protective material of high air perviousness, which by virtue of its high protective function against noxiant/poison materials of the aforementioned kind, especially chemical warfare agent materials, is suitable for deployment in the area of nuclear, biological, chemical (NBC) protection.

The present invention will now be described with reference to drawings/figures depicting preferred embodiments and/or working examples, while the observations in this regard hold for all aspects of the present invention and the corresponding preferred embodiments shall not in any way be construed as limiting.

Figure 1B:
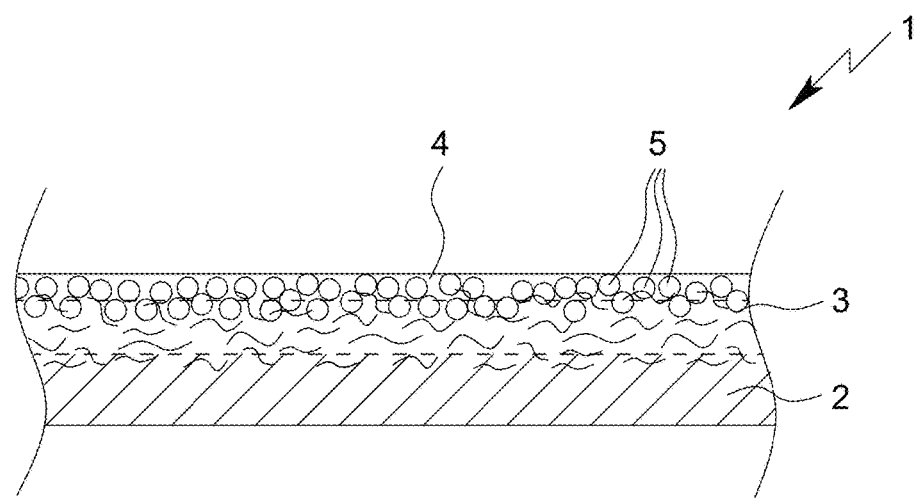
FIG. 1B shows an enlarged cross-sectional depiction through the inventive textile type protective material and/or textile type adsorptive filtering material of multilayered construction wherein the adhesive layer extends partly into the textile carrier and wherein the adsorptive layer extends partly into the adhesive layer.
Figure 2A:
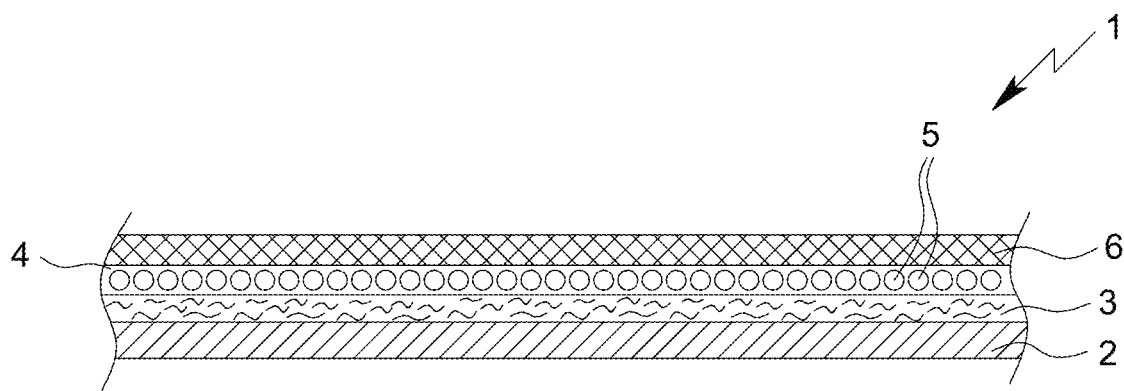
FIG. 2A shows a cross-sectional depiction through an inventive textile type protective material and/or textile type adsorptive filtering material in an inventive embodiment of multilayered construction with supplementary textile covering layer.
Figure 2B:
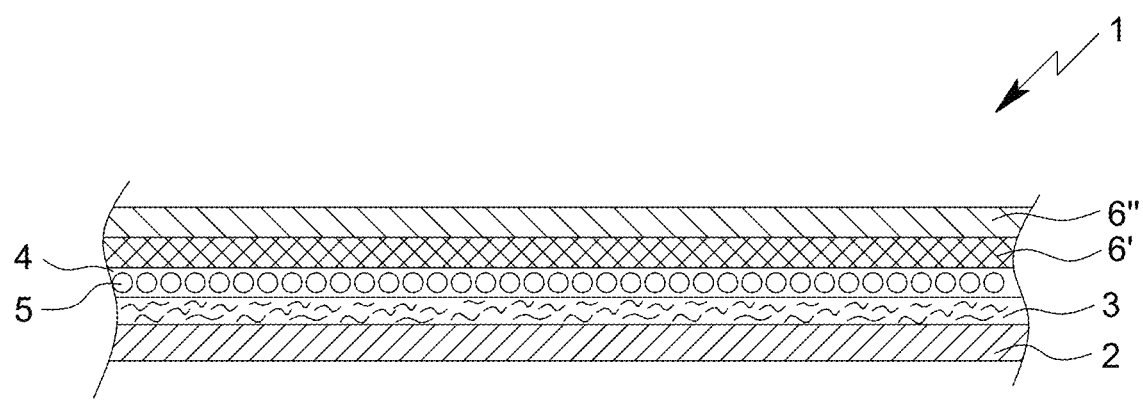
FIG. 2B shows a further schematic depiction of the construction of a textile type protective material and/or textile type adsorptive filtering material according to the invention in a further inventive embodiment whereby the protective material has two covering layers wherein the covering layer disposed between the outer covering layer and the adsorptive layer may be configured for example as particle/aerosol filter.
Figure 3A:
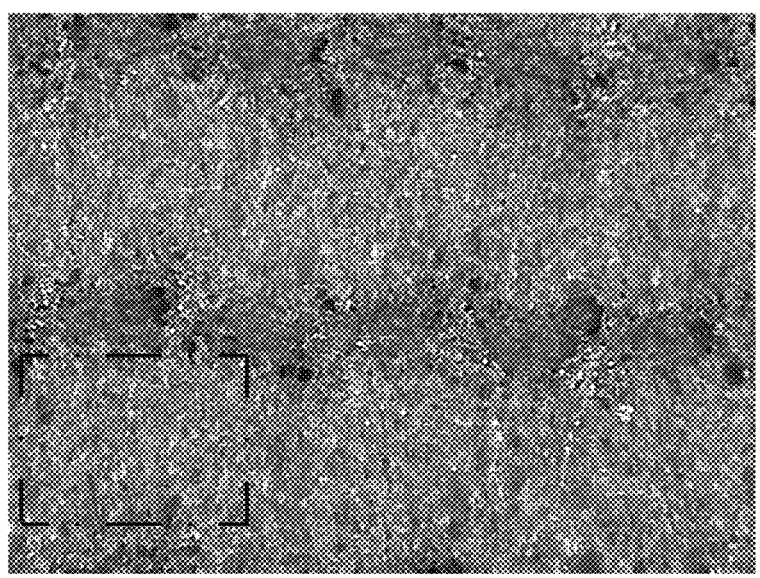
FIG. 3A shows a photographic plan view of the adhesive layer in the form of the air pervious and also dried/cured broken adhesive polymer foam.
Figure 3B:
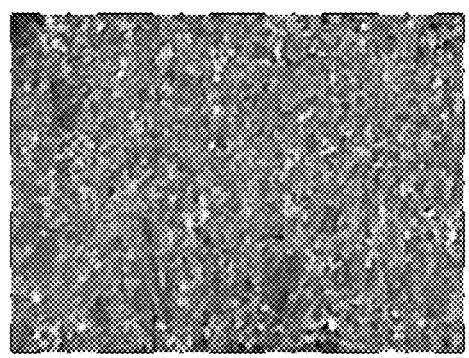
FIG. 3B shows an enlarged detail from the photographic plan view of FIG. 3A.
Figure 4:
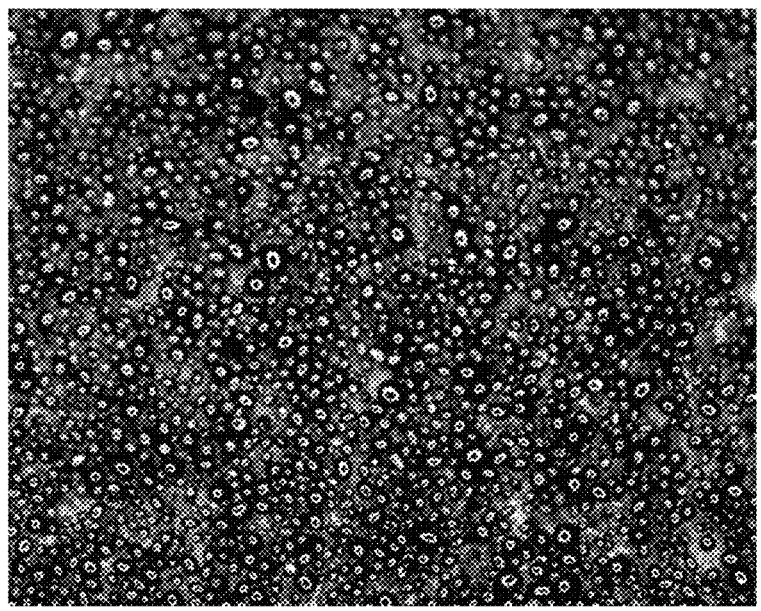
FIG. 4 shows a photographic plan view of the adsorptive layer with a full areal and homogeneous arrangement/distribution of the individual adsorbent particles on the adhesive layer in the form of the dried/cured broken adhesive polymer foam.
Figure 5:
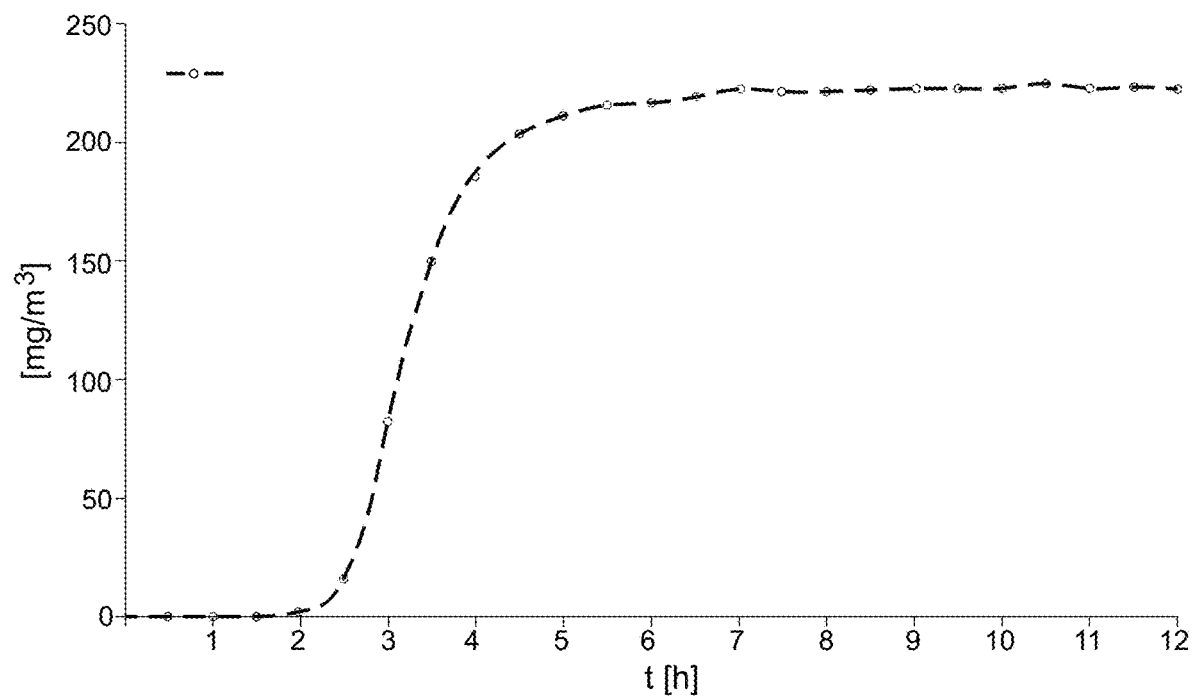
FIG. 5 shows a graphic depiction of the breakthrough behavior determined for an inventive textile type protective material in the course of a dynamic adsorption test.
Figure 6:
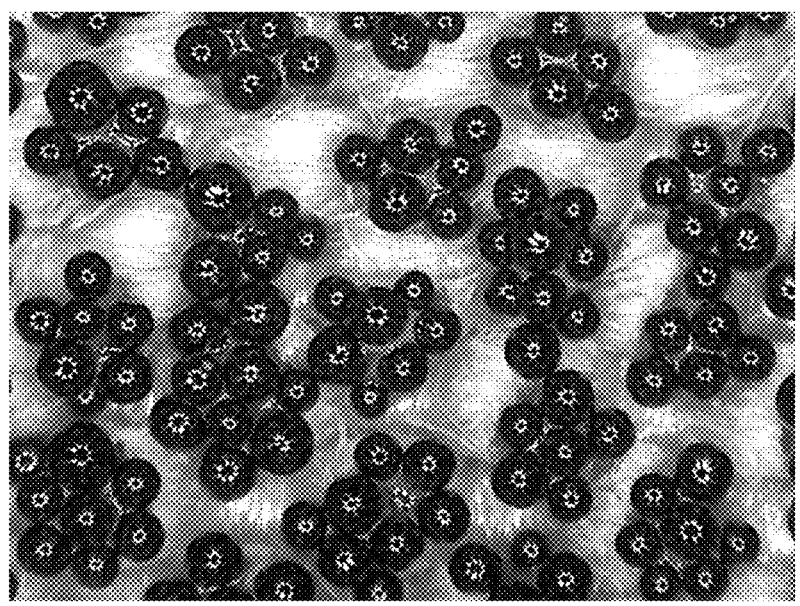
FIG. 6 shows a comparative depiction in the form of a photographic plan view of a material where the deployed adsorbents are fixed on a carrier by a discontinuous-punctuate application of a homogeneous nonfoamed adhesive (not in accordance with the present invention).

In the figures,

FIG. 1A shows a cross-sectional depiction through an inventive textile type protective material and/or textile type adsorptive filtering material wherein the protective material includes a textile carrier having an adhesive layer applied thereon in the form of an air pervious, dried/cured broken adhesive polymer foam wherein a multiplicity of individual adsorbent particles are adhered on the adhesive layer to form an adsorptive layer;

FIG. 1B shows an enlarged cross-sectional depiction through the inventive textile type protective material and/or textile type adsorptive filtering material of multilayered construction wherein the adhesive layer extends partly into the textile carrier and wherein the adsorptive layer extends partly into the adhesive layer;

FIG. 2A shows a cross-sectional depiction through an inventive textile type protective material and/or textile type adsorptive filtering material in an inventive embodiment of multilayered construction with supplementary textile covering layer;

FIG. 2B shows a further schematic depiction of the construction of a textile type protective material and/or textile type adsorptive filtering material according to the invention in a further inventive embodiment whereby the protective material has two covering layers wherein the covering layer disposed between the outer covering layer and the adsorptive layer may be configured for example as particle/aerosol filter;

FIG. 3A shows a photographic plan view of the adhesive layer in the form of the air pervious and also dried/cured broken adhesive polymer foam;

FIG. 3B shows an enlarged detail from the photographic plan view of FIG. 3A;

FIG. 4 shows a photographic plan view of the adsorptive layer with a full areal and homogeneous arrangement/distribution of the individual adsorbent particles on the adhesive layer in the form of the dried/cured broken adhesive polymer foam;

FIG. 5 shows a graphic depiction of the breakthrough behavior determined for an inventive textile type protective material in the course of a dynamic adsorption test;

FIG. 6 shows a comparative depiction in the form of a photographic plan view of a material where the deployed adsorbents are fixed on a carrier by a discontinuous-punctuate application of a homogeneous nonfoamed adhesive (not in accordance with the present invention).

The figures relating to the present invention, especially FIGS. 1A, 1B and also 2A, 2B and FIGS. 3A, 3B and also 4, illustrate particularly also the first inventive aspect of the present invention whereby there is provided a textile type protective material 1, especially with protective function against radioactive noxiant and/or poison materials and/or against biological noxiant and/or poison materials and/or against chemical noxiant and/or poison materials, preferably a textile type adsorptive filtering material, wherein the textile type protective material 1 comprises:

(a) a preferably two-dimensional and/or sheetlike, specifically air pervious textile carrier 2, especially in the form of a textile sheetlike material;

(b) an adhesive layer 3 applied on the textile carrier 2, wherein the adhesive layer 3 is an air pervious and/or discontinuous layer based on a dried and/or cured, specifically crosslinked, broken adhesive polymer foam; and (c) an adsorptive layer 4 adhered to the adhesive layer 3, wherein the adsorptive layer 4 comprises or is formed from a multiplicity of individual adsorbent particles 5.

As noted, the present invention provides a protective material that unites—in one and the same material—the diametrically opposite properties of a high protective function against the noxiant/poison materials in question especially warfare agent materials, on the one hand, with, on the other, a high air transmission rate and/or, when used for protective apparel or the like, a high wearing comfort. The specific properties of the textile type protective material result from the concept of the present invention whereby, in a purpose-directed manner, as noted, an adhesive layer for fixing the adsorbents on the protective material and/or on the carrier of the protective material utilizes a material applied on the carrier in sheetlike form manner and taking the form of a dried/cured broken adhesive polymer foam to provide a homogeneous sheetlike coverage of the material with the adsorbent particles while at the same time providing a high air transmission rate. And the fixed adsorbents are also highly accessible to the medium to be cleaned up.

The present invention more particularly provides in this context that the broken adhesive polymer foam has a multiplicity of dried/cured, specifically crosslinked, destroyed/burst/collapsed foam bubbles (cf. FIGS. 3A and/or 3B).

More particularly, the broken adhesive polymer foam, especially the dried, specifically crosslinked, destroyed/burst/collapsed broken adhesive foam bubbles has/have a multiplicity of destroyed/broken/collapsed walls, lamellae/struts of underlying adhesive polymer.

The concept of the present invention—that the foam structure has so to speak been broken up and/or more particularly destroyed in accordance with the above observations—is the basis for producing—without wishing to be tied to this theory—an air pervious system preserving the integrity and flexibility of the overall layer within the broken adhesive polymer foam of the adhesive layer and enabling the transmission of air at right angles to the main extension plane of the adhesive layer, so what results on this basis is an altogether air pervious material. The present invention may in this context provide that it is especially the (foam bubble) walls and/or the (foam bubble) lamellae which will have been destroyed/broken in relation to the broken adhesive polymer foam, while the struts of the foam system, which are more stable in principle, may be left undestroyed and/or less destroyed, which leads to the maintenance of a stabilizing matrix structure on the part of the underlying broken adhesive polymer foam while at the same time enabling air to pass through the destroyed bubble walls along the broken foam and/or at right angles to the extension plane of the resulting adhesive layer.

The present invention may provide in particular that the broken adhesive polymer foam has a proportion of destroyed and/or burst and/or collapsed foam bubbles amounting to at least 10%, especially at least 30%, preferably at least 50%, more preferably at least 70%, yet more preferably at least 90% and most preferably at least 95%, based on the total number of foam bubbles in the broken adhesive polymer foam.

More particularly, the broken adhesive polymer foam has a proportion of destroyed and/or burst and/or collapsed foam bubbles in the range from 10% to 100%, especially in the range from 30% to 99.9%, preferably in the range from 50% to 99%, more preferably in the range from 70% to 99%, yet more preferably in the range from 90% to 98%, based on the total number of foam bubbles in the broken adhesive polymer foam.

The individual adjustment of the degree of breakage and/or of the proportion of destroyed foam bubbles may form the basis for being able to precisely adjust and/or custom tailor the material-related properties of the adhesive polymer foam and/or of the adhesive layer 3 of the protective material 1 according to the present invention, particularly with regard to the resulting degree of air perviousness. In addition, the present degrees of breakage and/or breaking through further ensure a high degree of stability for the sheetlike contiguous adhesive layer 3.

Further regarding the adhesive layer 3 and/or the broken adhesive polymer foam underlying the adhesive layer 3, therefore, the invention may provide that the broken adhesive polymer foam does not have an uninterrupted configuration. More particularly, the invention may provide that the broken adhesive polymer foam has a multiplicity of apertures, pores, channels/openings specifically extending in the broken adhesive polymer foam and/or a multiplicity of apertures, pores, channels/openings specifically conjoining the respective outside surfaces of the broken adhesive polymer foam and/or of the adhesive layer 3. It is therefore the structures based on the apertures, pores, channels/openings which, by providing connections and/or air channels between the particular outer layers of the adhesive layer 3 which lead to said air perviousness for the material. The outside surfaces of the adhesive layer 3 which have been referred to are more particularly the respective sides of the material in the main extension plane.

Further regarding the adhesive layer 3 provided according to the invention, one particularly preferred embodiment of the invention may provide that the broken adhesive polymer foam is contiguous/coherent. In other words, the present invention is more particularly such that the adhesive layer is altogether configured as a contiguous material and/or as layer of altogether contiguous matrix and/or scaffolding structure, so the integrity/stability underlying the layer as such is at least essentially not impaired in the context of the present invention. More particularly reference for this may also be made to FIG. 3A and the detail therefrom enlarged in FIG. 3B. In this context, the broken constituents of the adhesive polymer foam are believed, without wishing to be tied to this theory, to combine to form a contiguous assembly, i.e., the particular constituents of the broken adhesive polymer foam are altogether interconnected to form a stable layer. This results in a high level of strength for the adhesive layer 3 based on the broken adhesive polymer foam, this also furthering efficient fixing of the applied adsorbent particles 5 to form the adsorptive layer 4.

In a further preferred embodiment of the present invention, moreover, the adhesive layer 3 and/or the broken adhesive polymer foam is applied on the carrier 2 in an at least essentially full areal and/or whole sided manner. It may therefore be provided according to the invention that the adhesive layer 3 completely covers the textile carrier 2 of the protective material 1 according to the invention. The invention in this context is more particularly such that the adhesive layer 3 is on that side of the textile carrier 2 which in the donned state of the protective material (in the form of a protective suit, or the like, for instance) faces away from the wearer. The at least essentially complete coating/covering of the textile carrier 2 with the adhesive layer 3 based on the broken adhesive polymer foam ensures an at least essentially complete and/or whole areal occupation of the adhesive layer 3 and/or of the protective material 1 with the adsorbent particles 5, resulting in a productive increase of the protective function against the noxiant/poison materials in question (cf. FIG. 4 for instance). It may be further provided according to the invention that the broken adhesive polymer foam of the adhesive layer 3 versus a corresponding unfoamed adhesive polymer has an at least 5%, especially at least 10%, preferably at least 15%, more preferably at least 20% and yet more preferably at least 25% decreased mass density and/or decreased specifically area based volume weight, based on the unfoamed and/or continuous adhesive polymer. The unfoamed adhesive polymer referred to above for comparative purposes is more particularly the same material as used for the broken adhesive polymer foam, the comparative material in this regard being similarly in the cured/dried state yet without voids or the like. More particularly, this comparative material is an at least essentially air/bubble free system adduced here for comparative purposes.

More particularly, the broken adhesive polymer foam versus a corresponding unfoamed and/or continuous adhesive polymer has a from 5% to 80%, especially from 10% to 70%, preferably from 15% to 60% and more preferably from 20% to 55% decreased mass density and/or decreased specifically area based volume weight, based on the unfoamed and/or continuous adhesive polymer.

In the present invention, therefore, the step of providing the adhesive layer 3 in the form of a specific broken adhesive polymer foam also entails a corresponding decrease in the basis weight, so it is also on this basis that the present invention provides an altogether—and versus the prior art— lighter material (i.e., protective material 1 of decreased basis weight), which similarly also benefits the wearing comfort.

The invention may additionally provide that the broken adhesive polymer foam versus a corresponding intact and/or unbroken adhesive polymer foam has an at most 10%, especially at most 5%, preferably at most 1% increased mass density and/or increased specifically area based volume weight, based on the intact and/or unbroken adhesive polymer foam. The corresponding intact/nonbroken adhesive polymer foam adduced here for comparative purposes is a foam comprising the same adhesive polymer, and being of intact bubble, strut/lamellae structure. The possible presence of the altogether but minimal increase in the mass density and/or area based volume weight shows that the other properties of a foam are fundamentally maintained for the adhesive layer 3, as is similarly advantageous.

It may additionally be provided according to the invention that the broken adhesive polymer foam versus a corresponding intact and/or unbroken adhesive polymer foam has an at most 30%, especially at most 20%, preferably at most 10% and more preferably at most 5% decreased elasticity and/or reversible extensibility, based on the intact and/or unbroken adhesive polymer foam. More particularly, the broken adhesive polymer foam versus a corresponding intact and/or unbroken adhesive polymer foam has a from 5% to 30%, especially from 10% to 20% decreased elasticity and/or reversible extensibility, based on the intact and/or unbroken adhesive polymer foam.

According to the present invention, the (add-on) amount, or the basis weight, of the adhesive layer 3 may vary between wide limits. However, the invention does provide particularly good results for the air perviousness on the one hand and the fixing of the adsorbent particles 5 on the other, when the adhesive layer 3 has been applied and/or is present on the textile carrier 2 in an amount ranging from 5 g/m$^2$ to 60 g/m$^2$, especially from 10 g/m$^2$ to 50 g/m$^2$, preferably from 20 g/m$^2$ to 40 g/m$^2$, more preferably from 25 g/m$^2$ to 35 g/m$^2$. More particularly, the adhesive layer 3 should have a basis weight in the range from 5 g/m$^2$ to 60 g/m$^2$, especially in the range from 10 g/m$^2$ to 50 g/m$^2$, preferably in the range from 20 g/m$^2$ to 40 g/m$^2$ and more preferably in the range from 25 g/m$^2$ to 35 g/m$^2$. The aforementioned amounts/basis weights relate to the adhesive layer 3 in the dried/cured and broken state of the underlying foam (dry weight).

The adhesive layer 3 may have been applied in an at least essentially identical area based amount to the adsorptive layer. In addition, the adhesive layer 3 has an at least essentially identical basis weight to the adsorptive layer 4. In general, however, the invention may also provide that the adhesive layer 3 has been applied in a smaller area based amount than the adsorptive layer, and/or wherein the adhesive layer 3 has a lower basis weight than the adsorptive layer 4. This is because the deployment of a broken adhesive polymer foam provides an effective way to fix the deployed adsorbent particles 5 on the adhesive layer, so but minimal amounts of adhesive are required.

In this context of the present invention and in general, the adhesive layer 3 may have a thickness $d_3$ (cross-sectional thickness) of at most 1 mm, especially at most 0.5 mm, preferably at most 0.3 mm, more preferably at most 0.2 mm. In particular the adhesive layer 3 may have a thickness $d_3$ in the range from 0.01 mm to 1 mm, especially in the range from 0.05 mm to 0.75 mm, preferably in the range from 0.08 mm to 0.5 mm and more preferably in the range from 0.1 mm to 0.3 mm.

The adhesive layer 3 may further have a mass density or foam density in the range from 100 g/l to 500 g/l, especially in the range from 150 g/l to 400 g/l and preferably in the range from 200 g/l to 350 g/l. More particularly, the mass density of the adhesive layer is decreased by the porous and/or air filled structure of the broken adhesive polymer foam, consequentially also leading to reduced basis weights for the adhesive layer 3 and/or of the subject invention protective material 1 as a whole.

The invention may additionally be such that the adhesive layer 3 has partly penetrated into the carrier 2, and/or wherein the adhesive layer 3 extends into the textile carrier 2. FIG. 1B may particularly also be referenced in this regard. The result is a particularly firm bond between the textile carrier 2 on the one hand and the adhesive layer 3 on the other. The penetration of the adhesive layer 3 into the textile carrier 2 is, more particularly, controllable/adjustable in the context of the method according to the present invention whereby initially a foamed aqueous/organic solution and/or dispersion of the adhesive polymer is applied on the carrier, followed by appropriate curing and breaking of the foam. The penetration depth is controllable/custom tailorable, illustratively and nonlimitingly via the viscosity of the applied solution/dispersion, the material-related properties of the textile carrier 2 and and/or the contact pressure involved in applying the adhesive layer 3 on the carrier.

In this context, the adhesive layer 3 may extend into the textile carrier 2 across at least 5%, especially at least 10%, preferably at least 20%, more preferably at least 30%, yet more preferably at least 40% of the thickness $d_2$ of the textile carrier 2. In particular, the adhesive layer 3 may extend into the textile carrier 2 across at most 95%, especially at most 90%, preferably at most 80% and more preferably at most 70% of the thickness $d_2$ of the textile carrier 2. The thickness $d_2$ of the textile carrier is more particularly the corresponding cross-sectional thickness of the carrier.

But it may also be provided according to the invention that the adhesive layer 3 has at least essentially not penetrated into the carrier 2 and/or that the adhesive layer 3 does not at least essentially extend into the textile carrier 2. In this context, the adhesive layer 3 may have been laid down on the carrier 2.

The invention, as noted, more particularly provides that the broken adhesive polymer foam or the adhesive layer as such is obtainable by drying and/or curing, specifically crosslinking, a foamed, preferably mechanically foamed, aqueous or organic based, preferably aqueous based, solution and/or dispersion of the adhesive polymer specifically applied beforehand on the carrier 2, especially entailing an at least partial breaking of the foam provided by the foamed solution and/or dispersion of the adhesive polymer. The "adhesive polymer" as used herein particularly for the specifically foamed solution/dispersion of the adhesive polymer comprehends in this context particularly also adhesive prepolymers, which are generally amenable to a post-crosslinking reaction as may for example be carried out/realized in the course of the drying/curing to produce the broken foam.

In this context, the step of drying and/or curing, specifically crosslinking, has been carried out in the presence of at least one foam-former and optionally at least one foam stabilizer and optionally at least one crosslinker and optionally at least one emulsifier and optionally at least one thickener. The same holds mutatis mutandis for the preceding step of foam formation on the basis of the deployed dispersion/solution. In the context of the present invention, therefore, the adhesive layer 3 is generally produced by deploying an aqueous based solution/dispersion of the adhesive polymer that more particularly contains no or at least essentially no organic solvents and/or no or at least essentially no co-solvents.

The adhesive polymer deployed in the present invention to form the adhesive layer 3 may generally be selected from the group of polyacrylate (PA), polymethacrylate (PMA), polymethyl methacrylate (PMMA), polycarbonate (PC), polyurethane (PU) and silicones and also mixtures or combinations of at least two of the aforementioned compounds, preferably polyurethane (PU). Particularly good material-related properties are obtained in respect of the resulting protective material according to the invention when in the context of the present invention the adhesive polymer contains a polyurethane (PU) or is a polyurethane (PU). In general, the adhesive polymers mentioned above are also usable in high solids form.

The adhesive polymer solution/dispersion deployed for producing the broken adhesive polymer foam may contain an aqueous or organic based, preferably aqueous based, starting solution and/or dispersion of the adhesive polymer, especially in amounts ranging from 50 parts by weight to 150 parts by weight, especially from 70 parts by weight to 130 parts by weight, preferably from 90 parts by weight to 110 parts by weight, based on the solution/dispersion of the adhesive polymer. Specifically, the starting solution/the dispersion of the adhesive polymer and/or the solution/dispersion obtained after admixing further components may as such have a solids content, especially in the form of the adhesive polymer, in the range from 20 wt % to 80 wt %, especially in the range from 30 wt % to 70 wt %, preferably in the range from 40 wt % to 60 wt %, based on the solution/dispersion. In this context, the adhesive polymer solution/dispersion deployed to produce the broken adhesive polymer foam in the manner of the invention may as such contain the adhesive polymer in amounts ranging from 40 parts by weight to 160 parts by weight, especially from 60 parts by weight to 120 parts by weight, based on the solution/dispersion of the adhesive polymer.

The solution/dispersion of the adhesive polymer may further contain the dispersion medium or solvent, especially water, in amounts ranging from 50 to 200 parts by weight, especially from 80 to 160 parts by weight, based on the solution/dispersion of the adhesive polymer.

Optionally, the solution/dispersion of the adhesive polymer may additionally contain the foam-former in amounts ranging from 0.25 part by weight to 10 parts by weight, especially from 0.5 part by weight to 5 parts by weight and preferably from 0.75 part by weight to 2 parts by weight, based on the solution/dispersion of the adhesive polymer. Foam-formers useful in the context of the present invention are as such well known to the notional person skilled in the art, so no further observations are required in this regard. More particularly, the notional person skilled in the art is at all times able to select, and quantitatively align, the foam-former in question with the underlying adhesive polymer and the properties desired for the resulting foam and/or broken foam.

The foam stabilizer may further be a specifically anionic fatty acid salt. More particularly, the solution/dispersion of the adhesive polymer may contain the foam stabilizer in amounts ranging from 2 parts by weight to 25 parts by weight, especially from 3 parts by weight to 20 parts by weight, preferably from 5 parts by weight to 10 parts by weight, based on the solution/dispersion of the adhesive polymer.

The crosslinker may further be a specifically blocked isocyanate, preferably a specifically blocked aliphatic polyisocyanate, especially with an eye to the invention embodiment wherein a polyurethane is deployed as adhesive polymer. The solution/dispersion of the adhesive polymer may in this context contain the crosslinker in amounts ranging from 0.5 part by weight to 15 parts by weight, especially from 1 part by weight to 10 parts by weight and preferably from 3 parts by weight to 8 parts by weight, based on the solution/dispersion of the adhesive polymer.

The emulsifier which is usable for the purposes of the present invention may be a specifically nonionic polyglycol ether, preferably a specifically nonionic aryl polyglycol ether. More particularly, the solution and/or dispersion of the adhesive polymer contains the emulsifier in amounts ranging from 0.25 part by weight to 10 parts by weight, especially from 0.5 part by weight to 5 parts by weight and preferably from 1 part by weight to 3 parts by weight, based on the solution/dispersion of the adhesive polymer.

In addition, the solution and/or dispersion of the adhesive polymer may contain a thickener in amounts ranging from 0.05 part by weight to 5 parts by weight, especially from 0.1 part by weight to 3 parts by weight and preferably from 0.2 part by weight to 1 part by weight, based on the solution/dispersion of the adhesive polymer. The thickener may be an acrylate for example.

The underlying solution/dispersion of the adhesive polymer, the broken adhesive polymer foam and the adhesive layer may further each contain fillers, in particular inorganic fillers, or the like.

Precise selection and alignment of the abovementioned components allow adjustment and/or custom tailoring of the resulting material-related properties of the adhesive layer obtainable on this basis and taking the form of the broken adhesive polymer foam dried/cured out of the deployed solution/dispersion of the adhesive polymer.

In addition, the protective material according to the invention, especially the broken adhesive polymer foam and/or the adhesive layer, may have flame and/or fire resistant, antimicrobial, especially antibacterial, and/or biostatic and/or antistatic properties. To this end, the protective material according to the invention, especially the broken adhesive polymer foam and/or the adhesive layer, may contain at least one added substance selected from the group of flame and/or fire retardants; antimicrobial, in particular antibacterial, and/or biostatic agents; and antistats; and also mixtures or combinations thereof. The protective material according to the invention, especially the broken adhesive polymer foam and/or the adhesive layer, may contain at least one dye.

The adsorptive layer 4 of protective material 1 according to the invention may further be discontinuous. More particularly, the adsorptive layer 4 may be configured as an adsorptive sheet type filter. As noted, the adsorbent particles 5 of adsorptive layer 4 which are deployed for the purposes of the present invention may occupy the adhesive layer 3 at least essentially completely and/or may have been applied on the adhesive layer 3 in an at least essentially full areal manner (cf. FIG. 4).

The cross-sectional thickness $d_4$ of adsorptive layer 4 may generally be in the range from 0.01 mm to 2.5 mm, especially from 0.02 mm to 2 mm, preferably from 0.03 mm to 1 mm and more preferably from 0.05 mm to 0.5 mm.

More particularly, the adsorptive layer 4 is situated on that side of adhesive layer 3 which in the donned state of the protective material of the present invention (in the form of protective apparel for example) faces away from the wearer (see also FIG. 1A with regard to the layered construction).

The present invention may utilize a multiplicity of different adsorptive materials for the adsorbent particles 5 to form the adsorptive layer 4:

The adsorbent particle 5 of the adsorptive layer 4 may be more particularly selected from the group of (i) specifically particulate activated carbon and/or activated carbon particles, preferably in the form of activated carbon corpuscles in granule form ("granulocarbon") or sphere form ("spherocarbon");

(ii) zeolites, especially natural and/or synthetic zeolites;

(iii) molecular sieves, especially zeolitic molecular sieves, synthetic molecular sieves and/or especially synthetic molecular sieves based on carbon, oxides and/or glasses;

(iv) metal oxide and/or metal particles;

(v) ion exchanger resins, especially polydisperse and/or monodisperse cation and/or anion exchangers, especially of the gel type and/or macroporous type;

(vi) inorganic oxides, especially silicon dioxides, silica gels and/or aluminum oxides;

(vii) porous organic polymers and/or porous organic-inorganic hybrid polymers and/or organometallic scaffolding materials, especially MOFs (Metal Organic Framework), COFs (Covalent Organic Framework), ZIFs (Zeolithe Imidazolate Framework), POMs (Polymer Organic Material) and/or OFCs;

(viii) mineral granules;

(ix) clathrates; and also (x) their mixtures and/or combinations.

In a particularly preferred embodiment of the invention, the adsorbent particles (5) of the adsorptive layer (4) are formed and/or consist of specifically particulate activated carbon and/or activated carbon particles, preferably in the form of activated carbon corpuscles in granule form ("granulocarbon") or sphere form ("spherocarbon").

The particular particle-forming materials of the adsorptive materials deployed for the purposes of the present invention are as such well known to the notional person skilled in the art, and the notional person skilled in the art is at all times able to select and align the particular particle-forming materials for endowing the protective material of the present invention with specific properties, especially adsorptive properties, in light of the present invention.

The observations which follow may also be referenced for activated carbons useful for the present invention. Details regarding MOF materials similarly useful for the invention are more particularly derivable from the international patent application WO 2009/096184 A1 and also from its German equivalent DE 10 2008 005 218 A1, either disclosure of which is hereby fully incorporated herein by reference.

The diameter and/or average diameter $D_{50}$ of adsorbent particles 5 deployed for the purposes of the present invention may similarly vary between wide limits. Particularly good results are obtained, however, when the diameter of the adsorbent particles 5, especially of the activated carbon particles, is in the range from 0.005 mm to 2.5 mm, preferably 0.01 mm to 2 mm, more preferably 0.015 mm to 0.5 mm, yet more preferably 0.02 mm to 0.3 mm and most preferably 0.03 mm to 0.15 mm. Additionally, the average diameter, especially the average diameter $D_{50}$, of the adsorbent particles 5, especially of the activated carbon particles, is in the range from 0.01 mm to 2 mm, especially 0.02 mm to 1 mm, preferably 0.03 mm to 0.5 mm, more preferably 0.04 mm to 0.4 mm and most preferably 0.04 mm to 0.2 mm. The present invention, in particular also by virtue of the good fixing to the adhesive layer in the form of the broken adhesive polymer foam and the high accessibility of the adsorbents, permits the deployment of relatively small adsorbent particles 5, which leads to yet a further decrease in the basis weight of the protective material 1 according to the present invention and moreover improves the occupancy of the surface of the adhesive layer, since the individual particles can be applied to the adhesive layer in a denser arrangement and/or with smaller interspaces (cf. FIG. 4 for instance).

The corresponding corpuscle sizes are determinable on the basis of the ASTM D 2862-97/04 method in particular. The aforementioned sizes may also be determined using methods based on sieve analysis, x-ray diffraction, laser diffractometry or the like. The particular methods of determination are as such well known to the notional person skilled in the art, so no further observations are required in this regard.

In general, the adsorbent particles 5, especially the activated carbon particles, are used in an amount ranging from 5 g/m$^2$ to 150 g/m$^2$, especially from 10 g/m$^2$ to 90 g/m$^2$, preferably from 15 g/m$^2$ to 50 g/m$^2$ and more preferably from 20 g/m$^2$ to 40 g/m$^2$. In particular, the protective material 1, especially the adsorptive layer 4, includes the adsorbent particles 5, especially the activated carbon particles, in an amount ranging from 5 g/m$^2$ to 150 g/m$^2$, especially from 10 g/m$^2$ to 90 g/m$^2$, preferably from 15 g/m$^2$ to 50 g/m$^2$ and more preferably from 20 g/m$^2$ to 40 g/m$^2$. This is because the add-on amount of the adsorbents can also be decreased in the context of the present invention by virtue of the uniform and homogeneous distribution of the adsorbent particles 5 on the adhesive layer 3, further minimizing the basis weight.

Regarding the activated carbon and/or activated carbon particles (hereinafter also referred to as just activated carbon) used/deployed in the context of the present invention as such, the parameter indications recited herein in respect of the underlying activated carbon and/or activated carbon particles are determined using standardized or explicitly reported methods or using methods inherently familiar to the notional person skilled in the art. Particularly the parameter data concerning the characterization of the porosity of the pore size distribution and other adsorptive properties each derive in general from the corresponding nitrogen sorption isotherms of the activated carbon in question and/or of the products measured. In addition, the pore distribution, particularly also with regard to the micropore content in relation to the overall pore volume, may be determined on the basis of DIN 66135-1.

In a preferred embodiment of the present invention, wherein activated carbon and/or activated carbon particles are deployed as adsorbent particles 5 and/or as adsorptive material, the activated carbon may be obtainable by carbonizing and subsequently activating a synthetic and/or non-naturally based starting material, especially based on organic polymers.

In this context, the activated carbon may be obtained from a starting material based on organic polymers, especially based on sulfonated organic polymers, preferably based on divinylbenzene crosslinked polystyrene, preferably based on styrene-divinylbenzene copolymers, especially by carbonizing and subsequently activating the starting material. In this context, the divinylbenzene content of the starting material may be in the range from 1 wt % to 20 wt %, especially from 1 wt % to 15 wt %, preferably from 1.5 wt % to 12.5 wt % and more preferably from 2 wt % to 10 wt %, based on the starting material.

According to the present invention, the starting material for the activated carbon is a specifically sulfonated and/or sulfo-containing ion exchanger resin, especially of the gel type.

In a preferred embodiment of the present invention, a polymer based spherical activated carbon (PBSAC) may be used as activated carbon. In particular, the activated carbon may be a polymer based spherical activated carbon (PBSAC). Activated carbons of this type are notable for outstanding adsorptive properties with regard to the aforementioned noxiant/poison materials and for outstanding mechanical properties, such as hardness and abrasion resistance.

The activated carbon deployed may in principle be obtainable by known methods of the prior art: In particular, for this purpose, spherical sulfonated organic polymers, especially based on divinylbenzene crosslinked polystyrene, are carbonized and then activated to afford the activated carbon in question, particularly as noted above. Further details in this regard are derivable for example from the printed publications DE 43 28 219 A1, DE 43 04 026 A1, DE 196 00 237 A1 and EP 1 918 022 A1 and/or from the equivalent, the same patent family's co-member U.S. Pat. No. 7,737,038 B2, the respective content of which is hereby fully incorporated herein by reference.

Activated carbons and/or activated carbon particles deployed in the context of the present invention are commercially available in general. Useful activated carbons include, for example, those available from Blucher GmbH, Erkrath, Germany or from AdsorTech GmbH, Premnitz, Germany.

It will prove advantageous in the context of the present invention for the activated carbon deployed for the purposes of the present invention to have a further specificized total pore volume, especially a Gurvich total pore volume, as set out in what follows.

The activated carbon in this context may have a total pore volume, in particular a Gurvich total pore volume, in the range from 0.3 cm$^3$/g to 3.8 cm$^3$/g, in particular from 0.4 cm$^3$/g to 3.5 cm$^3$/g, preferably 0.5 cm$^3$/g to 3 cm$^3$/g, more preferably from 0.6 cm$^3$/g to 2.5 cm$^3$/g, yet more preferably from 0.5 cm$^3$/g to 1.5 cm$^3$/g. In particular, at least 65%, in particular at least 70%, preferably at least 75%, more preferably at least 80% of the total pore volume, in particular of the Gurvich total pore volume, of the activated carbon may be formed by pores having pore diameters of at most 50 nm, in particular by micro- and/or mesopores.

In particular 50% to 95%, in particular 60% to 90%, preferably 70% to 85% of the total pore volume, in particular of the Gurvich total pore volume, of the activated carbon may be formed by pores having pore diameters of at most 50 nm, in particular by micro- and/or mesopores. In addition, 1% to 60%, in particular 5% to 50%, preferably 10% to 40%, more preferably 15% to 35% of the total pore volume, in particular of the Gurvich total pore volume, of the activated carbon may be formed by pores having pore diameters of more than 2 nm, in particular by meso- and/or macropores. In particular the activated carbon may have a pore volume, in particular a carbon black micropore volume, formed by pores having pore diameters of at most 2 nm (i.e., <2 nm), in the range from 0.05 cm$^3$/g to 2.5 cm$^3$/g, in particular from 0.15 cm$^3$/g to 2 cm$^3$/g, preferably 0.3 cm$^3$/g to 1.5 cm$^3$/g. In this context, in particular 15% to 98%, in particular 25% to 95%, preferably 35% to 90% of the total pore volume of the activated carbon may be formed by pores having pore diameters of at most 2 nm, in particular by micropores.

Regarding microporous activated carbon useful for the purposes of the present invention, moreover, the commonly assigned European patent application EP 1 918 022 A1 and also the parallel US 2008/0107589 A1 can be referenced, either disclosure thereof hereby being fully incorporated herein by reference.

The Gurvich determination of total pore volume is a method of measurement/determination which is well known per se to a person skilled in the art. For further details regarding the Gurvich determination of total pore volume, reference may be made for example to L. Gurvich (1915), *J. Phys. Chem. Soc. Russ.* 47, 805, and also S. Lowell et al., Characterization of Porous Solids and Powders: Surface Area Pore Size and Density, Kluwer Academic Publishers, Article Technology Series, pages 111 ff. More particularly, the pore volume of activated carbon may be determined on the basis of the Gurvich rule as per the formula $V_P=W_a/\rho_1$, where $W_a$ is the adsorbed quantity of an underlying adsorbate and $\rho_1$ is the mass density of the adsorbate employed (cf. also formula (8.20) as per page 111, chapter 8.4) of S. Lowell et al.).

The carbon black method of determination is known per se to a person skilled in the art; moreover, for further details of the carbon black method of determining the pore surface area and the pore volume, reference may be made for example to R. W. Magee, *Evaluation of the External Surface Area of Carbon Black by Nitrogen Adsorption*, Presented at the Meeting of the Rubber Division of the American Chem. Soc., October 1994, as cited in, for example: *Quantachrome Instruments, AUTOSORB-1, AS*1 *WinVersion* 1.50, Operating Manual, OM, 05061, Quantachrome Instruments 2004, Florida, USA, pages 71 ff. More particularly, a t-plot method may be used to analyze the data in this regard.

Determining the specific surface area as per BET is in principle known per se to a person skilled in the art, so no further details need be provided in this regard. All BET surface areas reported/specified relate to the determination as per ASTM D6556-04. In the context of the present invention, the so-called Multi-Point BET method of determination (MP-BET) in a partial pressure range $p/p_0$ from 0.05 to 0.1 is used to determine the BET surface area in general and unless hereinbelow expressly stated otherwise.

In respect of further details regarding determination of BET surface area and regarding the BET method, reference can be made to the aforementioned ASTM D6556-04 and also to Rompp Chemielexikon, 10$^{th}$ edition, Georg Thieme Verlag, Stuttgart/New York, headword: "BET-Methode", including the references cited there, and to Winnacker-Küchler (3$^{rd}$ edition), volume 7, pages 93 ff. and also to Z. Anal. Chem. 238, pages 187 to 193 (1968).

In the context of the present invention, the term "micropores" refers to pores having pore diameters of less than 2 nm, whereas the term "mesopores" refers to pores having pore diameters in the range from 2 nm (i.e., 2 nm inclusive) up to 50 nm inclusive, and the term "macropores" refers to pores having pore diameters of more than 50 nm (i.e., >50 nm).

The activated carbon may further have a specific BET surface area in the range from 600 m$^2$/g to 4000 m$^2$/g, in particular from 800 m$^2$/g to 3500 m$^2$/g, preferably from 1000 m$^2$/g to 3000 m$^2$/g, more preferably from 1200 m$^2$/g to 2750 m$^2$/g, most preferably from 1300 m$^2$/g to 2500 m$^2$/g.

In addition, the activated carbon may have a surface area formed by pores having pore diameters of at most 2 nm, in particular by micropores, in the range from 400 to 3500 m$^2$/g, in particular from 500 to 3000 m$^2$/g, preferably from 600 to 2500 m$^2$/g, more preferably from 700 to 2000 m$^2$/g.

In particular the activated carbon may have a surface area formed by pores having pore diameters in the range from 2 nm to 50 nm, in particular by mesopores, in the range from 200 to 2000 m²/g, in particular from 300 to 1900 m²/g, preferably from 400 to 1800 m²/g, more preferably from 500 to 1700 m²/g.

The activated carbon which is useful for the purposes of the present invention may additionally have an average pore diameter in the range from 0.1 nm to 55 nm, in particular from 0.2 nm to 50 nm, preferably from 0.5 nm to 45 nm, more preferably from 1 nm to 40 nm.

Regarding the absorptive layer 4 as such, the invention may provide that, as depicted in FIG. 1B, the absorptive layer 4 extends partly into the adhesive layer 3. In this context, the invention may provide that individual adsorbent particles 5 extend into the adhesive layer 3 and/or are also completely present in the adhesive layer 3. This not only improves the fixing of the adsorbent particles 5 as a whole but also increases the occupation density of the adsorbent particles 5 on the adhesive layer 3.

The invention may provide in this context that the adsorptive layer 4 extends into the adhesive layer 3 across at least 10%, especially at least 15% and preferably at least 20% of the thickness $d_3$ of the adhesive layer 3. In this context the adsorptive layer 4 extends into the adhesive layer 3 across at most 60%, especially at most 50% and preferably at most 40% of the thickness $d_3$ of the adhesive layer 3.

The textile carrier 2 deployed according to the present invention may moreover be configured as a textile sheetlike construct, preferably an air pervious textile material, more preferably a woven, knitted, laid, nonwoven or bonded fabric. More particularly the textile carrier 2 may have a basis weight in the range from 10 g/m² to 400 g/m², especially from 20 g/m² to 200 g/m² and more preferably from 30 g/m² to 150 g/m². The textile carrier 2 may generally have a thickness $d_2$ (cross-sectional thickness) in the range from 0.02 mm to 5 mm, especially from 0.05 mm to 3 mm, preferably from 0.1 mm to 2 mm and more preferably from 0.2 mm to 1 mm.

As depicted especially in FIG. 2A and FIG. 2B, the protective material may have at least one (outer) covering layer 6. In this context the covering layer 6 may be disposed on that side of the adsorptive layer 4 which faces away from the textile carrier 2 and/or the adhesive layer 3. In this context the covering layer 6 may be secured/adhered to the adsorptive layer 4 and/or the adhesive layer 3, for example as a consequence of the inherent tackiness of the adhesive layer. In addition, fixing may also be ensured by using a pressure sensitive adhesive, especially a dispersion adhesive, especially wherein the pressure sensitive adhesive has been applied discontinuously.

More particularly, the covering layer 6 may be a textile sheetlike construct, preferably an air pervious textile material, especially a woven, knitted, laid, nonwoven or bonded fabric, especially a nonwoven. In addition, the covering layer 6 may have a basis weight in the range from 1 g/m² to 200 g/m², especially from 5 g/m² to 100 g/m², preferably from 10 g/m² to 50 g/m². More particularly the covering layer 6 may have a basis weight of at most 200 g/m², especially at most 100 g/m² and preferably at most 50 g/m².

For the purposes of the present invention, the textile carrier 2 and/or the covering layer 6 may each be independently a textile sheetlike construct consisting of natural and/or synthetic fibers, preferably synthetic fibers (manufactured fibers). More particularly the textile carrier 2 and/or the covering layer 6 may each be independently a textile sheetlike construct with or of natural and/or synthetic fibers, especially from the group of polyesters (PES); polyolefins, such as polyethylene (PE) and polypropylene (PP), polyvinyl chloride (CLF); polyvinylidene chloride (CLF); acetate (CA); triacetate (CTA); polyacrylic (PAN); polyamide (PA); polyaramids; polyvinyl alcohol (PVAL); polyurethanes; polyvinyl esters; (meth)acrylates; and also their mixtures or combinations. In addition the covering layer 6 may have a thickness in the range from 0.001 to 10 mm, especially from 0.01 to 5 mm and preferably from 0.01 to 1 mm.

Furthermore, the textile carrier 2 and/or the covering layer 6 may each independently have an air transmission rate of at least 150 l·m⁻²·s⁻¹, especially at least 200 l·m⁻²·s⁻¹, preferably at least 250 l·m⁻²·s⁻¹, more preferably at least 400 l·m⁻²·s⁻¹ and most preferably at least 800 l·m⁻²·s⁻¹ or more, at a flow resistance of 127 Pa.

It may also be provided in this context that a composite underlying the protective material 1 of the present invention, and/or a corresponding combination formed from the textile carrier 2 and the adhesive layer 3 has an air transmission rate of at least 125 l·m⁻²·s⁻¹, especially at least 150 l·m⁻²·s⁻¹, preferably at least 200 l·m⁻²·s⁻¹, more preferably at least 300 l·m⁻²·s⁻¹, and most preferably at least 700 l·m⁻²·s⁻¹ or more, at a flow resistance of 127 Pa.

Owing to its specific design and construction, particularly with regard to the use of an adhesive layer based on a broken adhesive polymer foam, the protective material 1 of the present invention may in principle also already have particle and/or aerosol filtering properties. This trait may additionally be yet further productively enhanced by specifically configuring the covering layer 6 as a particle/aerosol filtering layer.

It may accordingly be provided according to the present invention that the covering layer 6 is configured as a high efficiency penetration or particulate air (HEPA) filter or as an ultra low penetration penetration or particulate air (ULPA) filter. In this context the covering layer 6 may be configured as a high efficiency penetration or particulate air (HEPA) filter or as an ultra low penetration penetration or particulate air (ULPA) filter.

In this context, the covering layer 6, especially the particle and/or filtering layer, may be a textile sheetlike construct consisting of textile fibers. More particularly the average diameter of the textile fibers may be at most 50 μm, especially at most 30 μm, preferably at most 20 μm, more preferably at most 10 μm, yet more preferably at most 5 μm and most preferably at most 2 μm. In addition, the diameter of the textile fibers may be in the range from 0.05 to 50 μm, especially from 0.1 to 50 μm, preferably from 0.2 to 30 μm, more preferably from 0.2 to 20 μm and most preferably from 0.5 to 10 μm.

In addition, the covering layer 6, especially the particle and/or aerosol filtering layer, may be a textile sheetlike construct consisting of textile fibers and having pores or meshes bordered by the textile fibers, wherein the textile sheetlike construct has an average pore size or average mesh size of at most 200 μm, especially at most 100 μm, preferably at most 75 μm, more preferably at most 50 μm and most preferably at most 40 μm.

In addition, the covering layer 6, especially the particle and/or aerosol filtering layer, may be a textile sheetlike construct consisting of textile fibers and having pores or meshes bordered by the textile fibers, wherein the ratio of the average pore size or mesh size to the average diameter of the textile fibers may be in the range from 0.1 to 2000, especially from 1 to 500, preferably from 5 to 350, more preferably from 10 to 300 and most preferably from 25 to 250.

In this context, the covering layer 6, especially the particle and/or aerosol filtering layer, may have a DIN EN 779 (July 1993) mean natural dust efficiency $E_m$ of at least 40%, especially at least 50%, preferably at least 70%, more preferably at least 90% and most preferably at least 95%. In this context the particle and/or aerosol filtering layer 6 may have a DIN EN 779 (July 1993) mean synthetic dust efficiency $A_m$ of at least 50%, especially at least 70%, preferably at least 90%, more preferably at least 95% and most preferably at least 99%.

The covering layer 6, especially the particle and/or aerosol filtering layer, may have a DIN EN 1822 (April 1998; DEHS aerosol, MPPS=0.1 to 0.3 μm) cumulative initial penetration $D_i$ of at most 50%, especially at most 40%, preferably at most 30%, more preferably at most 20% and most preferably at most 10%.

In addition, the covering layer 6, especially the particle and/or aerosol filtering layer, may provide at an inflow speed of 0.1 m/s an average collection rate of at least 80%, especially at least 90% and preferably at least 95% with regard to particles and/or aerosols having diameters in the range from 0.1 to 0.3 μm. More particularly the particle and/or aerosol filtering layer 6 may provide at an inflow speed of 0.1 m/s an average collection rate of at least 95%, especially at least 98% and preferably at least 99% with regard to particles and/or aerosols having diameters≥2 μm, especially≥1.5 μm.

One embodiment of the present invention, especially as depicted in FIG. 2B, may provide that the protective material 1 according to the invention has at least two covering layers 6', 6". In this context, one of the covering layers 6', 6" may be configured as particle and/or aerosol filtering layer, especially as defined previously. In this context, the covering layer 6' configured as particle and/or aerosol filtering layer may additionally be disposed between the further covering layer 6" and the adsorptive layer 4. FIG. 2B may also be referenced in this regard.

The present invention may additionally provide that the protective material has a further (inner) covering layer. This further covering layer may be disposed in particular on that side of the textile carrier 2 which faces away from the adhesive layer 3. The (inner) covering layer may in this regard be secured/adhered to the textile carrier 2 via a pressure sensitive adhesive, more particularly a dispersion adhesive, and this more particularly on that side of the carrier 2 which faces away from the adhesive layer 3. To this end, the pressure sensitive adhesive/composition may have been applied in a discontinuous/punctuate form. Regarding the materials deployed for the further (inner) covering layer, the above remarks regarding the first covering layer 6 may be referenced.

The protective material 1 according to the invention has altogether outstanding properties, as set out in what follows:

Namely, the protective material 1 according to the invention may have a total basis weight in the range from 80 g/m² to 500 g/m², especially from 90 g/m² to 400 g/m², preferably from 100 g/m² to 250 g/m².

In addition, the protective material 1 according to the invention may have a gas/air transmission rate of at least 50 $l \cdot m^{-2} \cdot s^{-1}$, especially at least 100 $l \cdot m^{-2} \cdot s^{-1}$, preferably at least 150 $l \cdot m^{-2} \cdot s^{-1}$, more preferably at least 200 $l \cdot m^{-2} \cdot s^{-1}$, yet more preferably at least 250 $l \cdot m^{-2} \cdot s^{-1}$ and most preferably at least 350 $l \cdot m^{-2} \cdot s^{-1}$, and/or up to 10 000 $l \cdot m^{-2} \cdot s^{-1}$ at a flow resistance of 127 Pa.

The protective material 1 according to the invention may further have a thickness $d_1$ in the range from 0.1 to 15 mm, especially from 0.2 to 10 mm, preferably from 0.3 to 5.0 mm and more preferably from 0.4 to 3.0 mm. This thickness $d_1$ is the overall cross-sectional thickness of the protective material according to the present invention (cf. particularly FIG. 1A).

The protective material of the present invention further also displays an outstanding protective function against noxiant/poison materials, especially chemical warfare agent materials. To wit, the protective material 1 according to the invention may more particularly have a barrier effect with regard to noxiant and/or poison materials, especially chemical warfare agents, especially bis[2-chloroethyl] sulfide, as determined by method 2.2 of CRDC-SP-84010, permitting permeance of at most 4 μg/cm² per 24 h, especially at most 3.5 μg/cm² per h, preferably at most 3.0 μg/cm² per 24 h, more preferably at most 2.5 μg/cm² per 24 h, yet more preferably at most 2.25 μg/cm² per 24 h and most preferably at most 2 μg/cm² per 24 h.

The present invention also relates to that aspect of the present invention whereby the textile type protective material 1 according to the invention is obtainable by the hereinbelow described method for producing same. The present invention thus also relates to a textile type protective material 1, especially with protective function against radioactive noxiant and/or poison materials and/or against biological noxiant and/or poison materials and/or against chemical noxiant and/or poison materials, preferably a textile type adsorptive filtering material, wherein the textile type protective material 1 is obtainable by the hereinbelow described process of the invention.

The present invention additionally further provides—in accordance with a further aspect of the present invention—a method for producing the textile type protective material, especially with protective function against radioactive noxiant and/or poison materials and/or against biological noxiant and/or poison materials and/or against chemical noxiant and/or poison materials, preferably for producing the textile type adsorptive filtering material of the invention, especially as defined previously, wherein said method comprises the following steps in the stated order:

(a) providing a preferably two-dimensional and/or sheetlike, specifically air pervious textile carrier, especially in the form of a textile sheetlike material;

(b) applying an adhesive layer on the textile carrier, wherein the adhesive layer is applied in the form of a foamed, preferably mechanically foamed, aqueous or organic based, preferably aqueous based, solution and/or dispersion of an adhesive polymer;

(c) applying and/or adhering a multiplicity of individual adsorbent particles on the adhesive layer obtained in step (b), especially such that the result is an adsorptive layer applied on the adhesive layer;

(d) drying and/or curing, especially crosslinking, the adhesive layer in the form of the foamed solution and/or dispersion of the adhesive polymer, entailing some breaking of the foam provided by the foamed solution and/or dispersion of the adhesive polymer, so the adhesive layer is obtained and/or present as dried and/or cured, specifically crosslinked, broken adhesive polymer foam.

In the context of the present invention, breaking the adhesive polymer foam at least partially may be effected in step (d) in particular.

The method of the present invention has the specific objective that initially a preferably undried and/or uncured (incompletely cured) adhesive layer based on a foamed aqueous/organic based solution/dispersion of an adhesive polymer be applied on the previously provided textile carrier. The adsorbent particles are subsequently applied on the foamed solution/dispersion layer thus provided on the carrier, this in turn being followed by a step of drying/curing the adhesive layer in the form of the solution/dispersion of the adhesive polymer to obtained the dried/cured and broken adhesive polymer foam.

The foam breaking in the defined manner provided by the present invention is believed—without wishing to be tied to this theory—to be particularly caused in the context of the method according to the present invention by dispersion medium/solvent, especially water, escaping out of the foamed solution/dispersion of the adhesive polymer in the course of the drying/curing of the adhesive layer leading to the foam bubbles and of the underlying foam structures (struts, walls, lamellae and/or the like) breaking up.

The foam structure breaking up in the manner discussed may additionally also be induced by mechanical importation of energy, for example even in the course of the foamed solution/dispersion being applied on the textile carrier and/or in the course of the adsorbent particles being applied on the adhesive layer as induced (for example, by some pressing down on the foam by a squeegee/coating knife/a roll or respectively of the adsorbent particles on the adhesive layer).

The step of producing/providing the broken adhesive polymer foam is, as noted, more particularly accompanied by the foam bubbles underlying the foam being destroyed and/or burst and/or collapsed, creating in this connection a multiplicity of destroyed/broken/collapsed walls/lamellae/struts of adhesive polymer, so, as a result, breaking/breaking up the previously foamed layer as a whole.

This—very surprisingly—does not or at least essentially not decrease the stability of the broken adhesive polymer foam thus obtained, this being believed—without wishing to be tied to this theory—to be particularly associated with the procedure of the present invention, whereby the breaking/destruction of the foam structures takes place before or in the course of said drying/curing, so the broken structures are being stabilized in the course of said drying/curing.

Preferably, in the method of the present invention, step (a) utilizes the textile carrier in the form of a textile sheetlike construct, preferably in the form of an air pervious textile material, more preferably in the form of a woven, knitted, laid, nonwoven or bonded fabric.

In addition, the foamed solution and/or dispersion utilized in step (b) is foamed by gas and/or air importation into the solution and/or dispersion of the adhesive polymer. More particularly, the step of foaming up out of the underlying solution/dispersion to provide the foamed solution/dispersion of the adhesive polymer is carried out before the application thereof to the textile carrier of the protective material. The gas and/or air importation is effected by gas and/or air being imported into the solution and/or dispersion of the adhesive polymer by injection, stirring, vibrational importation, shaken importation, blowing and/or shear force importation. The foam-formers which are usable according to the present invention are also capable of inducing/augmenting foam formation.

In this context, the foamed solution and/or dispersion of the adhesive polymer is adjusted to a mass density in the range from 50 g/l to 500 g/l, especially from 75 g/l to 400 g/l and preferably from 100 g/l to 300 g/l. In this context, the unfoamed adhesive polymer solution/dispersion underlying the foaming step may have a mass density in the range from 800 g/l to 1200 g/l.

The underlying adhesive polymer should be more particularly selected from the group of polyacrylate (PA), polymethacrylate (PMA), polymethyl methacrylate (PMMA), polycarbonate (PC), polyurethane (PU) and silicones and also mixtures or combinations of at least two of the aforementioned compounds, preferably polyurethane (PU). In one preferred embodiment of the present invention, a polyurethane (PU) is deployed as adhesive polymer.

Particularly good results regarding the formation of the foamed solution/dispersion and hence also of the resulting layer of the dried/cured broken adhesive polymer foam are obtained when the solution and/or dispersion of the adhesive polymer contains at least one foam-former and optionally at least one foam stabilizer and optionally at least one crosslinker and optionally at least one emulsifier and optionally at least one thickener. Regarding the underlying quantitative particulars, the above remarks regarding the protective material of the present invention may be referenced.

More particularly, the deployed solution/dispersion of the adhesive polymer should have a solids content, especially in the form of the adhesive polymer, in the range from 20 wt % to 80 wt %, especially in the range from 30 wt % to 70 wt %, preferably in the range from 40 wt % to 60 wt $, based on the solution and/or dispersion of the adhesive polymer. More particularly, the adhesive polymer solution and/or dispersion deployed for the purposes of the present invention should have a dispersion medium and/or solvent content, especially water content, in the range from 20 wt % to 80 wt %, especially from 30 wt % to 70 wt %, preferably from 40 wt % to 60 wt %, based on the solution and/or dispersion of the adhesive polymer.

Applying the adhesive layer based on the solution/dispersion on the textile carrier in step (b) may be carried out in any number of ways each as such well known to the notional person skilled in the art, so no further exposition is required in this regard. More particularly, step (b) of applying the adhesive layer on the textile carrier is effected by knifecoating. In this context, the step of knifecoating the adhesive layer on the textile carrier is effected by knife over roll, knife on air, screen application and/or application by use of direct roll on roll systems. In addition, the application step is effected using an open squeegee system and/or a closed squeegee system. Another possibility is to roll the foamed dispersion/solution onto the textile carrier, especially with a subsequent step of uniformizing/distributing the applied layer by smooth spreading. The step of applying the adhesive layer in the form of the foamed solution/dispersion of the adhesive polymer may be more particularly effected at room temperature.

More particularly, step (b) may be carried out such that the foamed solution and/or dispersion is applied on the textile carrier in an amount ranging from 10 g/m$^2$ to 150 g/m$^2$, especially from 20 g/m$^2$ to 100 g/m$^2$ and preferably from 40 g/m$^2$ to 80 g/m$^2$ (wet weight and/or wet add-on, i.e., add-on of the undried solution/dispersion).

More particularly, step (b) may be carried out such that the foamed solution and/or dispersion of the adhesive polymer is applied on the textile carrier in a thickness ranging from 0.01 mm to 2 mm, especially from 0.05 mm to 1.5 mm, preferably from 0.1 mm to 0.75 mm and more preferably from 0.15 mm to 0.5 mm.

Further regarding the method of the present invention, step (c) of applying and/or adhering the adsorbent particles is effected by sprinkling and/or trickling and/or laying the adsorbent particles on the adhesive layer, optionally by and/or with subsequent pressing of the adsorbent particles against and/or onto the adhesive layer. Said pressing may be effected via a roll or the like for example. An at least partial breaking of the underlying foam may also already be present/carried out in the course of said pressing.

In a further possible embodiment, the adsorbent particles are applied and/or adhered on the adhesive layer in step (c) such that an at least essentially full areal occupancy of the adhesive layer with the adsorbent particles results, and/or such that at least 80%, especially at least 90%, preferably at least 95%, more preferably at least 99% and more preferably at least 99.5% of the area of the adhesive layer becomes occupied by the adsorbent particles. In this context, therefore, a particularly dense occupation of the surface of the adhesive layer is realizable according to the present invention in that particles may be closely packed to obtain a quasi continuous layer. As noted, the adsorbent corpuscles/particles are applied on that side of the adhesive layer which faces away from the textile carrier.

In a further possible embodiment of the present invention, step (d) comprises drying and/or curing at a temperature in the range from 30° C. to 250° C., especially 50° C. to 200° C., preferably 70° C. to 180° C. and more preferably 90° C. to 160° C. In addition step (d) comprises drying and/or curing for a period in the range from 0.1 min to 15 min, especially 0.5 min to 10 min and preferably 1 min to 5 min. Where the adhesive layer is primarily to be dried in the context of the method according to the present invention, comparatively low temperatures are preferred, whereas with an additionally envisaged (post)crosslinking/curing of the adhesive layer appropriately higher temperatures may be employed.

In this context, step (d) comprises drying and curing, especially crosslinking, in succession and/or as separate steps. In particular, curing is effected after drying is effected. In this context, drying may be effected at a temperature in the range from 30° C. to 100° C., especially 50° C. to 80° C., especially for a period ranging from 0.1 min to 15 min. Curing may be effected at a temperature in the range from 100° C. to 250° C., especially from 120° C. to 200° C., especially for a period ranging from 0.1 min to 15 min.

According to the present invention, therefore, step (d) comprises obtaining the adhesive layer in the form of an air pervious and/or discontinuous layer based on the dried and/or cured, specifically crosslinked, broken adhesive polymer foam.

In the method of the present invention, the protective material is provided at least one covering layer in the context of a step (e), especially after practice of step (d). In this context, the covering layer may be disposed on that side of the adsorptive layer which faces away from the textile carrier and/or the adhesive layer. And the covering layer may be secured/adhered to the adhesive layer and/or the adsorptive layer, especially by using a pressure sensitive adhesive, especially a dispersion adhesive, especially wherein the pressure sensitive adhesive is applied in a discontinuous form.

The present invention altogether provides an efficient method for producing the textile type protective material according to the invention.

The present invention further provides—in a further aspect of the present invention—the method of using the protective material according to the invention as defined above in the manufacture of protective equipment and/or protective articles of any kind, especially protective apparel, especially for the civilian or military sector, such as protective suits, protective gloves, protective footwear, protective socks, head protective apparel and the like, and of protective coverings of any kind, preferably any aforementioned protective materials for NBC deployment and/or with protective function against radioactive noxiant and/or poison materials and/or against biological noxiant and/or poison materials and/or against chemical noxiant and/or poison materials.

The present invention further provides—in a further aspect of the present invention—the method of using the protective material according to the invention as defined above in the manufacture of filters and filtering materials of any kind, especially for removal of noxiant, odorant and poison materials of any kind, preferably for removal of radioactive noxiant and/or poison materials and/or of biological noxiant and/or poison materials and/or of chemical noxiant and/or poison materials, especially from air and/or gas streams, such as NBC respirator filters, odor filters, sheet filters, air filters, especially filters for indoor air cleaning, adsorption capable carrier structures and filters for the medical sector.

The present invention also provides—in a further aspect of the present invention—the protective equipments and/or protective articles of any kind, especially for the civilian or military sector, especially protective apparel, such as protective suits, protective gloves, protective footwear, protective socks, head protective apparel and the like, and of protective coverings of any kind, preferably any aforementioned protective equipments and/or protective articles for NBC deployment and/or with protective function against radioactive noxiant and/or poison materials and/or against biological noxiant and/or poison materials and/or against chemical noxiant and/or poison materials, obtained by using a protective material especially as defined above, and/or including a protective material especially as defined above.

The present invention finally further provides—in a further aspect of the present invention—filters and filtering materials of any kind, especially for removal of noxiant, odorant and poison materials of any kind, preferably for removal of radioactive noxiant and/or poison materials and/or of biological noxiant and/or poison materials and/or of chemical noxiant and/or poison materials, especially from air and/or gas streams, such as respirator filters, odor filters, sheet filters, air filters, especially filters for indoor air cleaning, adsorption capable carrier structures and filters for the medical sector, obtained by using a protective material especially as defined above, and/or including a protective material especially as defined above.

Further versions, alterations, variations, modifications, special features and advantages of the present invention will be readily apparent to and realizable by the ordinarily skilled on reading the description without their having to go outside the realm of the present invention.

The present invention is illustrated by the following exemplary embodiments which, however, shall in no way limit the present invention.

Exemplary Embodiments

Different textile type protective materials are produced, namely two inventive protective materials (protective materials A and B) and one comparative protective material (protective material C).

Inventive protective materials A and B are each produced by coating a textile carrier layer having a basis weight of about 80 g/m$^2$ uniformly with a previously mechanically foamed aqueous based solution/dispersion of an adhesive polymer by the adhesive layer being knifecoated onto the carrier in the form of the foamed solution/dispersion. The solution/dispersion material applied in the form of a foam has a mass density of about 200 g/l coupled with a solids content of about 50%, based on the solution/dispersion. The solution/dispersion is applied in an amount of about 60 g/m² (wet weight). The layer thus applied has a thickness of about 0.2 to 0.4 mm. Inventive protective material A is produced by applying a solution/dispersion of an adhesive polymer based on a polyurethane (PU), while inventive protective material B utilizes a solution/dispersion of an adhesive polymer based on polymethacrylate (PMA).

Each adhesive layer thus applied subsequently has applied on it a particulate activated carbon having an average corpuscle diameter of about 0.05 mm at a loading rate of about 35 g/m², by sprinkling and slight contact pressure. This is followed by a step of drying/curing the solution/dispersion of the adhesive polymer to further fix the adsorbents and to form the dried/cured broken adhesive polymer foam and/or the cured adhesive layer comprising the broken foam. This drying/curing is effected at temperatures between 100° C. and 150° C.

Inventive textile type protective materials A and B are obtained with a basis weight of about 30 g/m² (dry weight) for the dry adhesive layer in the form of the broken foam, textile type protective material A having an adhesive layer in the form of a polyurethane and textile type protective material B having an adhesive layer in the form of a polymethacrylate (PMA).

There is further provided a noninventive (comparative) adsorptive filtering material C corresponding to FIG. 6, wherein a textile carrier (basis weight about 80 g/m²) has fixed on it particulate adsorbents (average corpuscle diameter about 0.5 mm) in the form of activated carbon in an add-on amount of about 80 g/m² by using a discontinuously-punctuately applied adherent (homogeneously formed, unfoamed adhesive based on polyurethane), the add-on amount of adhesive being about 50 g/m², the resulting degree of occupancy with the adsorbents on the textile carrier being about 60%. A protective material is obtained on this basis in the form of comparative material C.

All three adsorptive filtering materials and/or protective materials A to C are tested for protective function against noxiant/poison materials (here specifically: mustard gas, HD):

A dynamic adsorption test is carried out as the first test, to determine the particular barrier effect with regard to mustard gas. For this purpose, an airstream containing mustard gas (HD concentration about 230 mg/m³) having a flow rate of about 0.5 cm/s is allowed to act on the particular adsorptive filtering materials at a constant flow resistance while the area based breakthrough rate is determined after various intervals (at defined relative humidity and temperature. The values thus obtained are illustratively shown in FIG. 5 for inventive adsorptive filtering material A.

The further inventive adsorptive material B gives values similar to material A. Comparative Example C is found to give, versus inventive protective materials A and B, an earlier occurrence of breakthrough, while the subsequent slope of the breakthrough curve is higher/steeper and over time the breakthrough concentration is somewhat up versus A and B.

Altogether, the tested materials A, B and C have good adsorptive properties, although inventive materials A and B achieve yet further improved results over comparative material C, and that at an altogether lower basis weight for inventive materials A and B.

The protective function against chemical warfare agent materials (mustard gas again) is further tested using the standardized laid drop diffusive flow test. For this, the particular adsorptive filtering materials (sample area: each 10 cm²) are clamped in a test cell over a PE membrane (10 µm), which simulates human skin, and warfare agent droplets (mustard gas, 8 drops of mustard gas each 1 µl in volume) are applied with a cannula on the materials to be tested. The airstream underneath the sample is drawn through a wash bottle. After the test, the cumulative breakthrough in µg/m² is measured by gas chromatography; the minimum requirement is for values of <4 µg/m² (test conditions: relative humidity<5%, temperature 30° C., 6 l/s airstream underneath the sample, 24 h run time). This test simulates the diffusion of liquid warfare agent through the textile type protective material without convection while the protective apparel rests in sheetlike contact with the skin, the latter being simulated by the PE membrane.

In this context, the mustard gas diffusion test gives a cumulative breakthrough [µm/cm²] of 3.3 for inventive material A and of about 3.5 for inventive protective material B, whereas a value of about 3.7 is determined in this regard for comparative material C.

The experimental results show that the protective function of inventive protective materials A and B is yet further improved over the comparative material, evidencing the outstanding effectiveness of the adsorptive filtering/protective material of the present invention in relation to the protective function against chemical poison/warfare agent materials while at the same time the basis weight is low.

Further tests are carried out to also examine the mechanical properties and/or the stability properties of textile type protective materials A to C:

The particular protective materials are first subjected to a scrub test in accordance with DIN ISO 5981. Inventive textile type protective material A is here observed not to give any significant abrasion in the form of activated carbon articles in particular. Inventive protective material B is found to give minimal abrasion in the form of individual particles of activated carbon. Comparative material C is likewise found to give some abrasion, similarly activated carbon particles in the main. The amount abraded in this regard is larger than that of the tested inventive protective materials A and B.

Finally, the textile type protective materials are subjected to a wash test in accordance with DIN EN ISO 5077. Inventive protective materials A and B exhibit a high level of durability therein, although inventive textile type protective material B is found to give worse values than inventive protective material A while overall the durability of material B to washing must be categorized as good. Compared with that, protective material C has a lower durability to washing, although material C overall still has a satisfactory to good durability to washing.

Inventive protective materials A and B thus altogether have a high stability/integrity, as evidenced by the scrub and washing tests, amounting to a productive improvement in this regard over comparative material C.

Inventive protective materials A and B further have an outstanding perviousness to air. In this regard, an air transmission rate of about 420 $l·m^{-2}·s^{-1}$ at a flow resistance of 127 Pa can be determined for inventive protective material A, while the corresponding value is about 400 $l·m^{-2}·s^{-1}$ for inventive material B.

Altogether, the tests described above demonstrate the outstanding properties of the protective materials provided on the basis of the concept of the present invention.

LIST OF REFERENCE SIGNS

1 Textile type protective material
2 Textile carrier
3 Adhesive layer
4 Adsorptive layer
5 Adsorbent particle
6 Covering layer
6' First covering layer
6" Second or further covering layer
$d_1$ Thickness of textile type protective material
$d_2$ Thickness of textile carrier
$d_3$ Thickness of adhesive layer
$d_4$ Thickness of adsorptive layer

What is claimed is:

1. A textile type protective material in the form of a textile type adsorptive filtering material having protective function against chemical, biological and radioactive noxiants and poisons, wherein the textile type protective material comprises:
    a two-dimensional air-pervious textile carrier in the form of a textile sheet-like material;
    an adhesive layer applied onto the textile carrier, wherein the adhesive layer is an air-pervious and discontinuously formed layer based on a dried and cured broken adhesive polymer foam, and wherein the adhesive layer has a basis weight of from 5 g/m² to 60 g/m²; and
    an adsorptive layer adhered to the adhesive layer, wherein the adsorptive layer comprises or is formed of a multiplicity of individual adsorbent particles, wherein the adsorbent particles are applied in an amount of 5 g/m² to 150 g/m².

2. The protective material as claimed in claim 1, wherein the broken adhesive polymer foam comprises a multiplicity of dried and cured foam bubbles which are destroyed, burst or collapsed.

3. The protective material as claimed in claim 1, wherein the broken adhesive polymer foam comprises a multiplicity of destroyed, broken or collapsed walls or struts of an adhesive polymer.

4. The protective material as claimed in claim 1, wherein the broken adhesive polymer foam comprises a proportion of destroyed, burst or collapsed foam bubbles of at least 30%, based on the total number of foam bubbles in the broken adhesive polymer foam.

5. The protective material as claimed in claim 1, wherein the broken adhesive polymer foam comprises a multiplicity of apertures, pores, channels or openings.

6. The protective material as claimed in claim 1, wherein the broken adhesive polymer foam is contiguously or coherently formed, and
wherein the broken adhesive polymer foam is applied on the carrier in an at least essentially full areal or wholesided manner.

7. The protective material as claimed in claim 1, wherein the adhesive layer partly penetrates or extends into the textile carrier.

8. The protective material as claimed in claim 1, wherein the broken adhesive polymer foam is obtained by drying and curing a foamed aqueous or organic-based solution or dispersion of the adhesive polymer, followed by a step of at least partially breaking the foam provided by the foamed solution or dispersion of the adhesive polymer.

9. The protective material as claimed in claim 1, wherein the adsorptive layer is configured as an adsorptive sheet-type filter; and
wherein the adsorbent particles of the adsorptive layer are formed of particulate activated carbon.

10. The protective material as claimed in claim 1, wherein the protective material has a total basis weight in the range of from 80 g/m² to 500 g/m², an air-transmission rate in the range of form 50 l·m$^{-2}$·s$^{-1}$ to 10 000 l·m$^{-2}$·s$^{-1}$ at a flow resistance of 127 Pa, and a thickness in the range from of 0.1 to 15 mm.

11. The protective material as claimed in claim 1, wherein the protective material has a barrier effect with regard to bis[2-chloroethyl] sulfide, as determined by method 2.2 of CRDC-SP-84010, of at most 4 µg/cm² per 24 h.

12. The protective material as claimed in claim 1, wherein the protective material is part of a protective equipment or protective article.

13. The protective material as claimed in claim 1, wherein the protective material is part of a protective equipment or protective article selected from the group consisting of protective apparel, protective apparel for the civilian or military sector, protective suits, protective gloves, protective footwear, protective socks, head protective apparel, protective coverings, protective equipments and protective articles with protective function against chemical, biological and radioactive noxiants and poisons.

14. The protective material as claimed in claim 1, wherein the protective material is part of filters or filtering materials.

15. The protective material as claimed in claim 1, wherein the protective material is part of filters or filtering materials selected from the group consisting of respirator filters, odor filters, sheet filters, air filters, filters for indoor air cleaning, adsorption capable carrier structures and filters for the medical sector.

16. A method for producing a protective material as claimed in claim 1,
wherein said method comprises the following steps in the stated order:
(a) providing a two-dimensional air-pervious textile carrier in the form of a textile sheet-like material;
(b) applying an adhesive layer onto the textile carrier, wherein the adhesive layer is applied in the form of a foamed aqueous or organic-based solution or dispersion of an adhesive polymer and wherein the foamed solution or dispersion of the adhesive polymer is applied onto the textile carrier in an amount ranging of from 10 g/m² to 150 g/m²;
(c) applying and adhering a multiplicity of individual adsorbent particles on the adhesive layer obtained in step (b), thus yielding an adsorptive layer applied onto the adhesive layer, wherein the adsorbent particles are applied in an amount ranging from 5 g/m² to 150 g/m²;
(d) drying and curing the adhesive layer in the form of the foamed solution or dispersion of the adhesive polymer, followed by a step of at least partially breaking the foam provided by the foamed solution or dispersion of the adhesive polymer, so that the adhesive layer is obtained as a dried and cured broken adhesive polymer foam.

17. The method as claimed in claim 16, wherein the solution or dispersion of the adhesive polymer contains at least one of a foam-forming agent and a foam-stabilizer.

18. A protective equipment or protective article comprising a protective material as claimed in claim 1.

19. The protective equipment or protective article as claimed in claim 18,
wherein the protective equipment or protective article is selected from the group consisting of protective apparel, protective apparel for the civilian or military sector, protective suits, protective gloves, protective footwear, protective socks, head protective apparel, protective coverings, protective equipments and protective articles with protective function against chemical, biological and radioactive noxiants and poisons.

20. A filter or filtering material comprising a protective material as claimed in claim 1.

21. The filter or filtering material as claimed in claim 20,
wherein the filter or filtering material is selected from the group consisting of respirator filters, odor filters, sheet filters, air filters, filters for indoor air cleaning, adsorption capable carrier structures and filters for the medical sector.

\* \* \* \* \*